United States Patent
Tatsumi

(10) Patent No.: US 9,482,935 B2
(45) Date of Patent: Nov. 1, 2016

(54) PROJECTION APPARATUS, METHOD FOR CONTROLLING PROJECTION APPARATUS, AND PROGRAM THEREFOR

(71) Applicant: CANON KABUSHIKI KAISHA, Tokyo (JP)

(72) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/042,905

(22) Filed: Oct. 1, 2013

(65) Prior Publication Data
US 2014/0104330 A1    Apr. 17, 2014

(30) Foreign Application Priority Data

Oct. 16, 2012   (JP) ................. 2012-229043
Dec. 11, 2012   (JP) ................. 2012-270700

(51) Int. Cl.
G03B 21/14    (2006.01)
G03B 21/20    (2006.01)
G03B 33/08    (2006.01)
H04N 9/31     (2006.01)
G09G 3/34     (2006.01)
G03B 33/06    (2006.01)

(52) U.S. Cl.
CPC ......... *G03B 21/142* (2013.01); *G03B 21/2033* (2013.01); *G03B 33/08* (2013.01); *G09G 3/3413* (2013.01); *H04N 9/3155* (2013.01); *H04N 9/3179* (2013.01); *G03B 21/2053* (2013.01); *G03B 33/06* (2013.01); *G09G 2300/0452* (2013.01); *G09G 2310/0235* (2013.01); *G09G 2320/0247* (2013.01); *G09G 2320/0261* (2013.01); *G09G 2320/062* (2013.01)

(58) Field of Classification Search
CPC ............... G09G 2320/0247; G09G 3/3413; G09G 2300/0452; G09G 2310/0235
USPC ................ 345/204, 696–697; 353/85, 121; 348/712, 571
See application file for complete search history.

(56) References Cited

U.S. PATENT DOCUMENTS

| | | | |
|---|---|---|---|
| 6,503,195 B1 * | 1/2003 | Keller ............... | A61B 1/00163 348/45 |
| 2005/0052621 A1* | 3/2005 | Allen .................. | H04N 9/3155 353/85 |
| 2005/0190172 A1* | 9/2005 | Koyama ........................ | 345/204 |
| 2007/0126757 A1* | 6/2007 | Itoh et al. ..................... | 345/690 |
| 2008/0158431 A1* | 7/2008 | Russell ........................ | 348/712 |
| 2010/0102234 A1* | 4/2010 | Hamasaki .............. | H04N 1/484 250/341.7 |
| 2011/0221885 A1* | 9/2011 | Suzuki .................. | G01N 21/21 348/125 |

FOREIGN PATENT DOCUMENTS

| | | |
|---|---|---|
| JP | 2002-215111 A | 7/2002 |
| JP | 2004-354717 A | 12/2004 |

(Continued)

*Primary Examiner* — Shaheda Abdin
(74) *Attorney, Agent, or Firm* — Canon USA, Inc. I.P. Division

(57) ABSTRACT

A projection apparatus for projecting an image of a display unit by emitting light from a light source includes a detection unit configured to detect flicker information indicating how easily flicker occurs based on input image information, and a control unit configured to control the number of light emissions of the light source in a time period during which an image in one frame is displayed by the display unit based on the flicker information detected by the detection unit.

35 Claims, 31 Drawing Sheets

(56) References Cited

FOREIGN PATENT DOCUMENTS

| | | |
|---|---|---|
| JP | 2005-266752 A | 9/2005 |
| JP | 2007-264427 A | 10/2007 |
| JP | 2008-70838 A | 3/2008 |
| JP | 2009-192753 A | 8/2009 |
| JP | 2009-251069 A | 10/2009 |
| JP | 2010-008871 A | 1/2010 |
| JP | 2010-141370 A | 6/2010 |
| JP | 2010-169723 A | 8/2010 |
| JP | 2011-28107 A | 2/2011 |
| JP | 2011-95402 A | 5/2011 |

\* cited by examiner

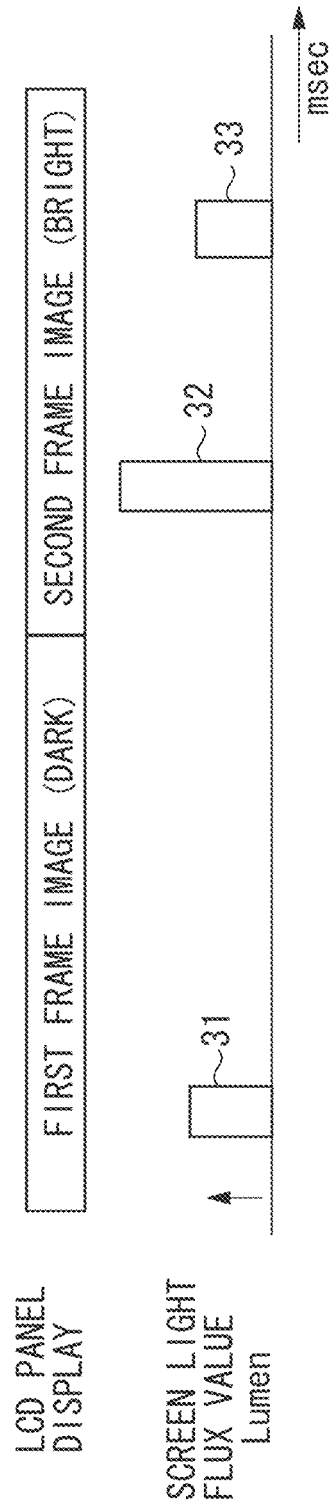

DISPLAY PATCH

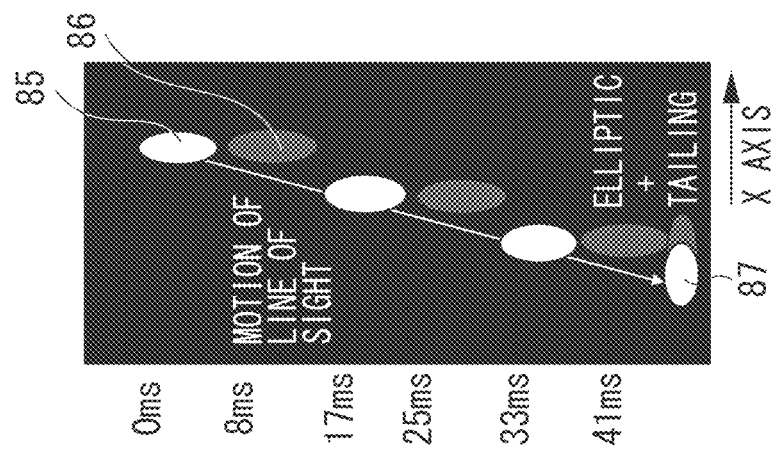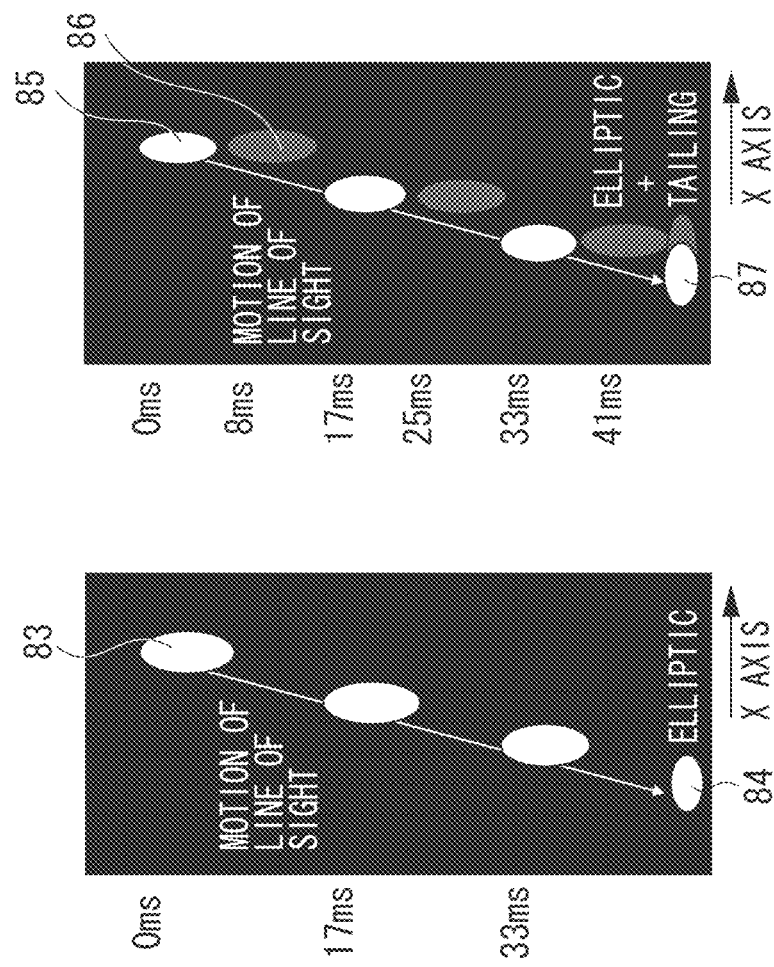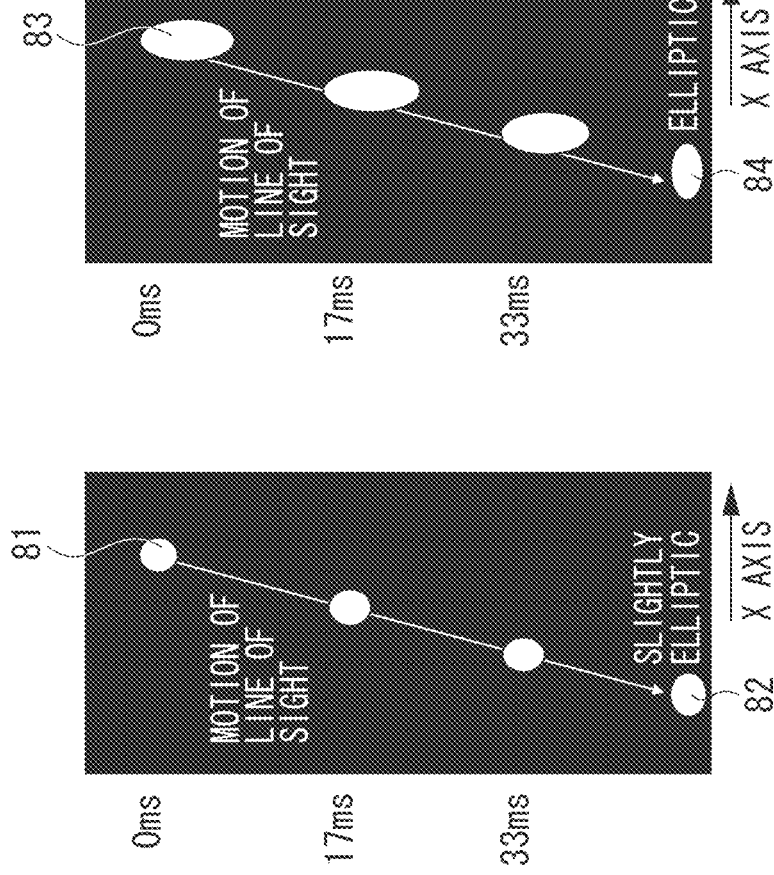

TWO SHORT LIGHT EMISSIONS

THIRD EXEMPLARY EMBODIMENT

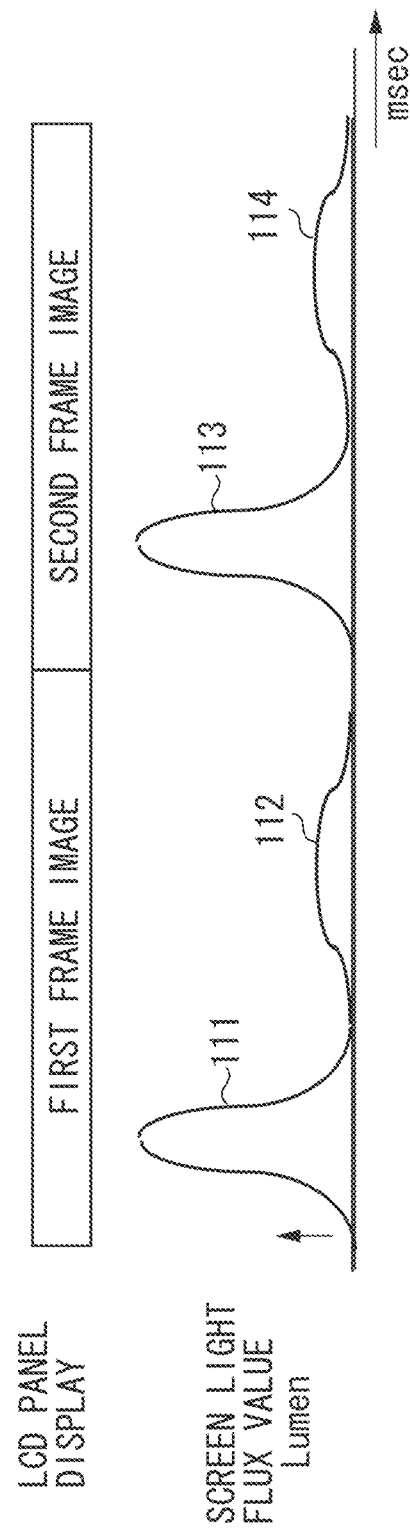

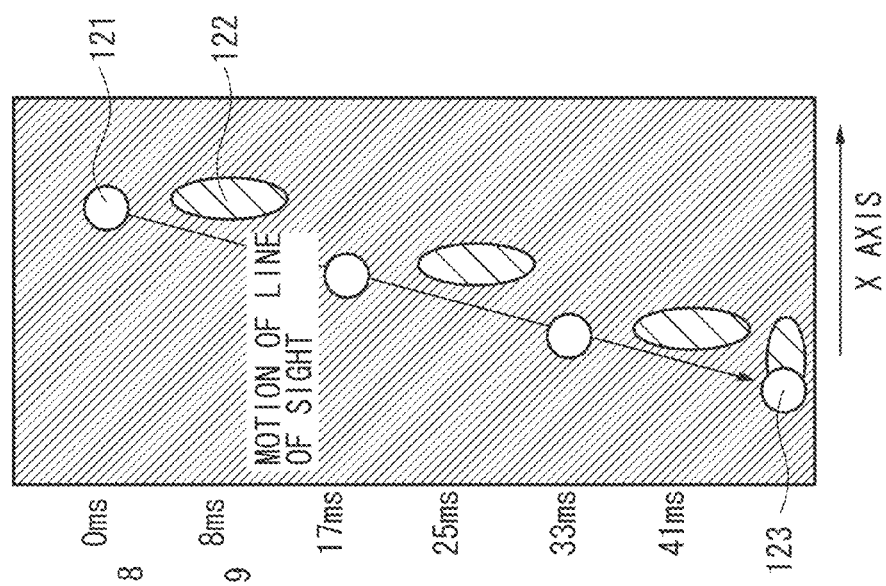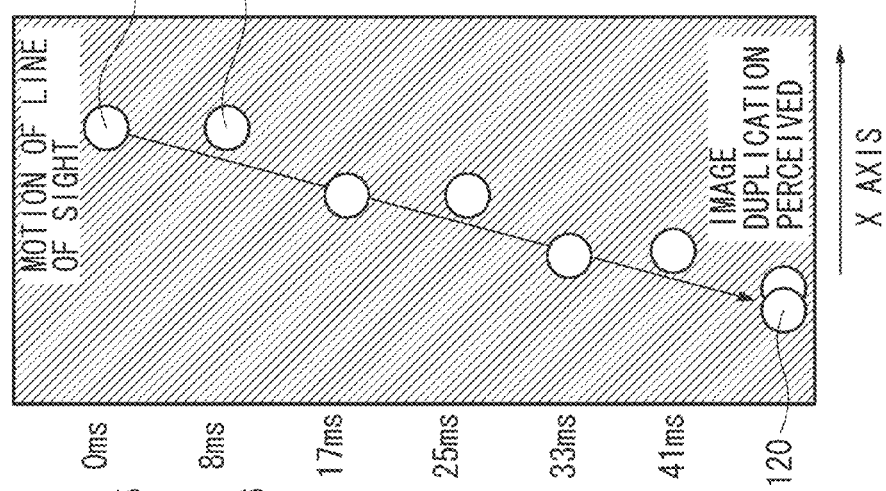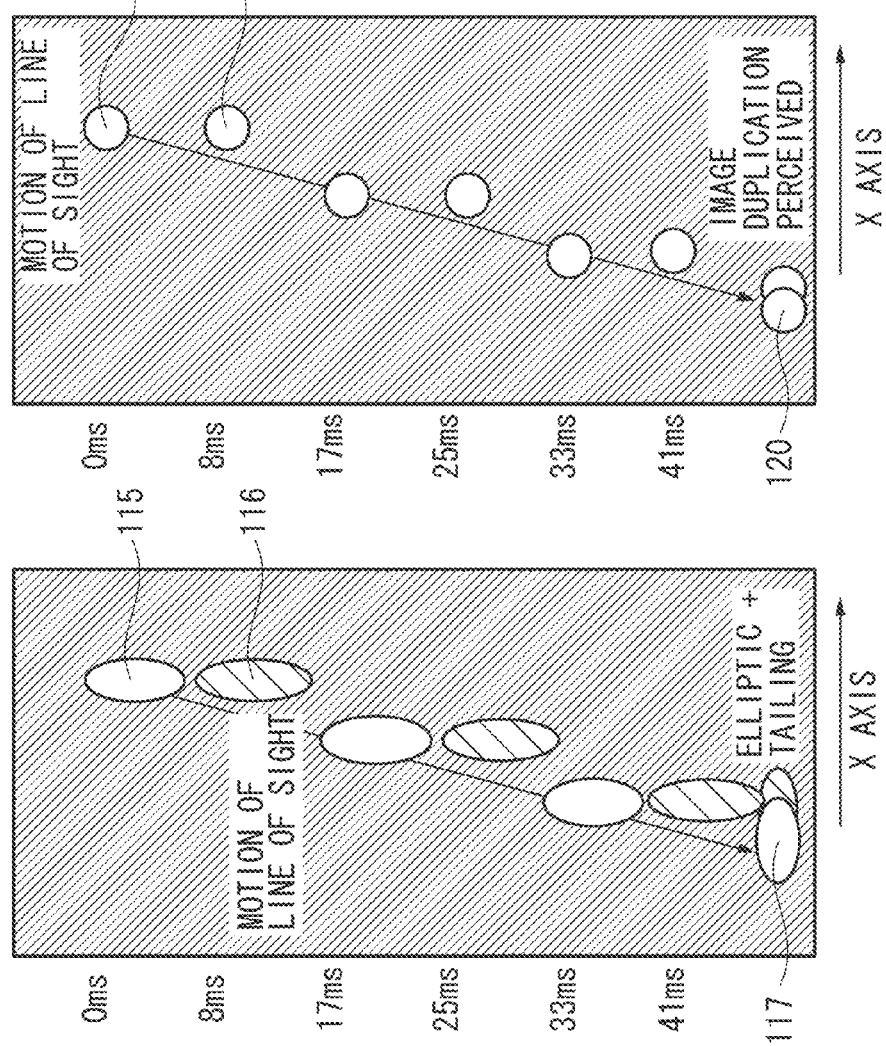

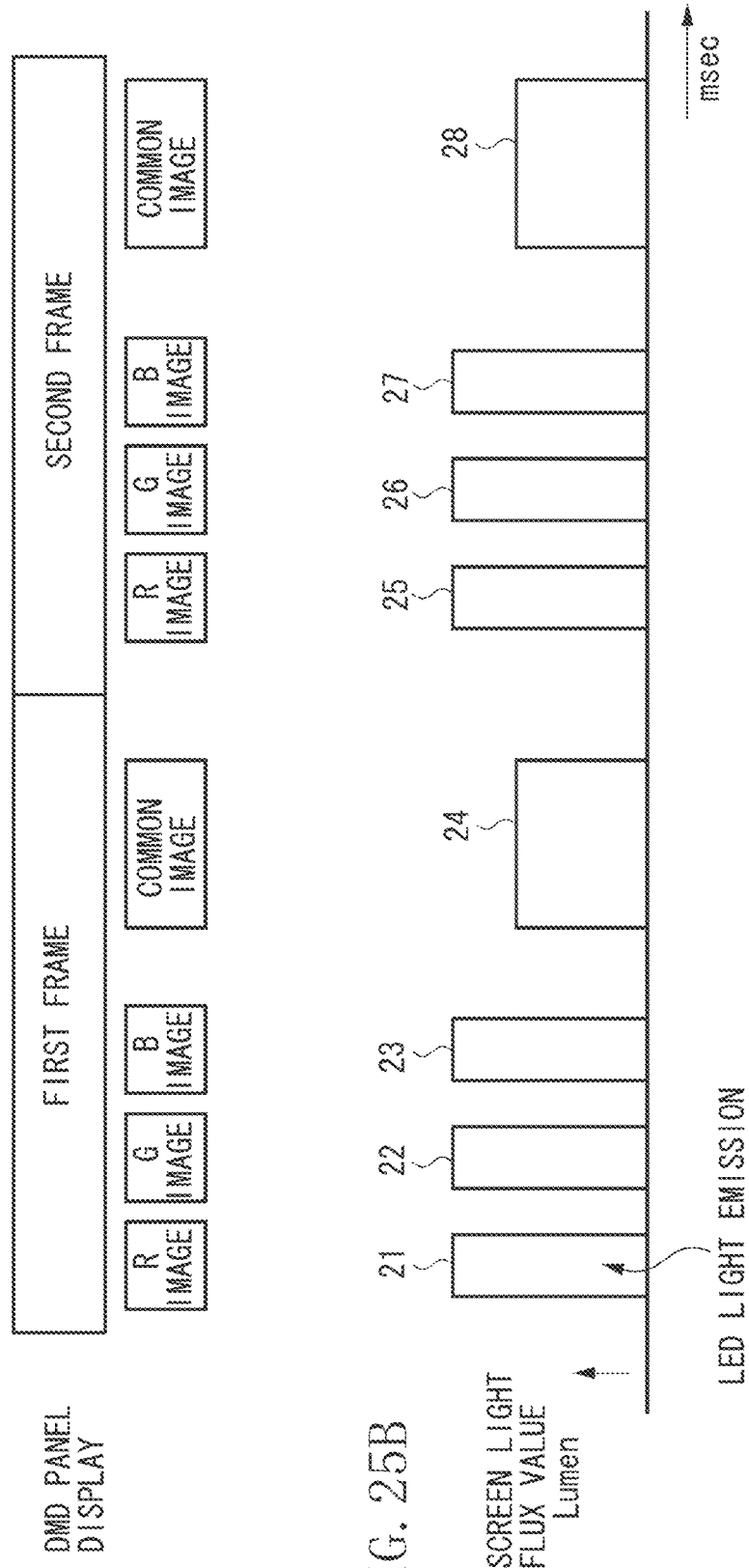

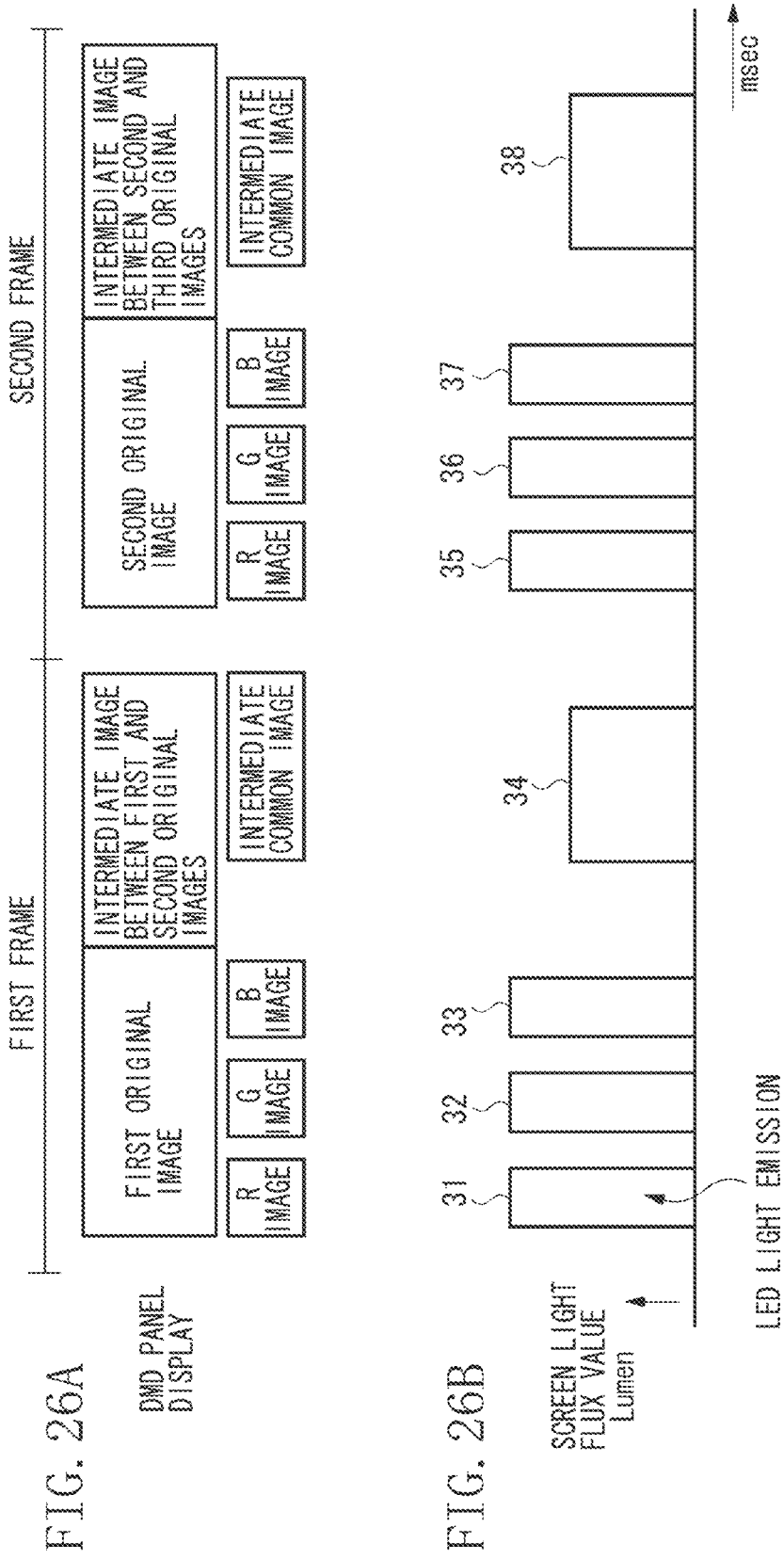

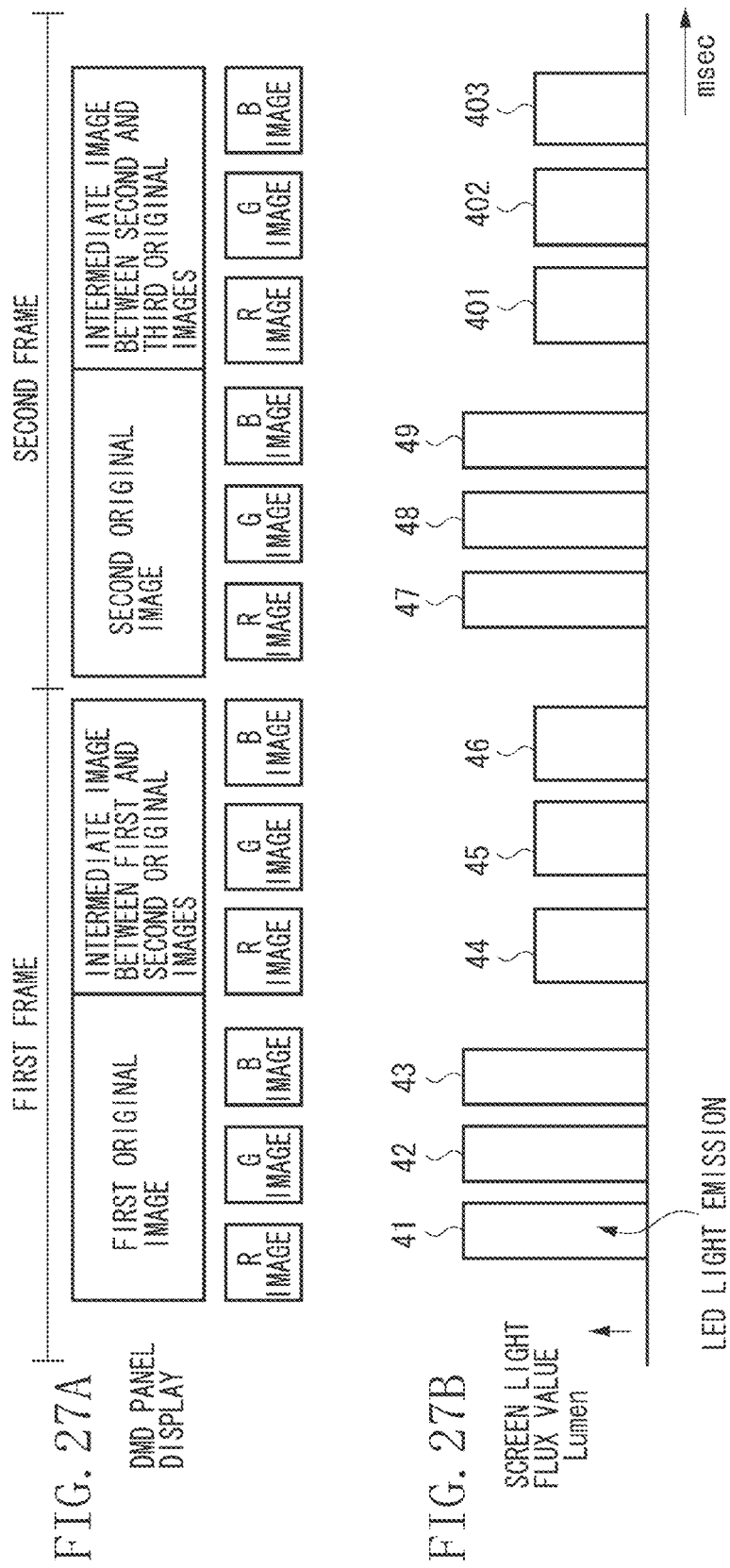

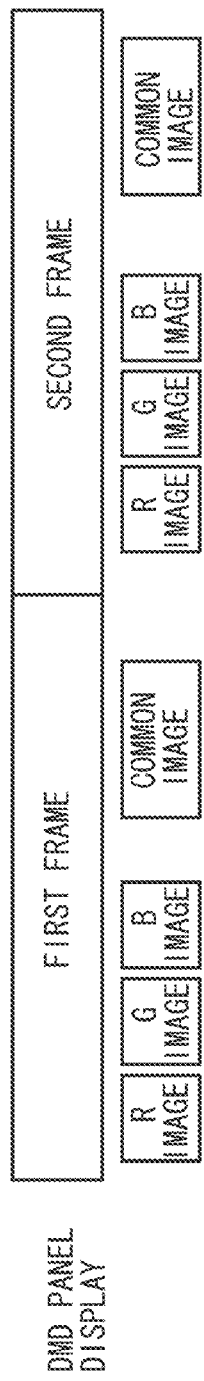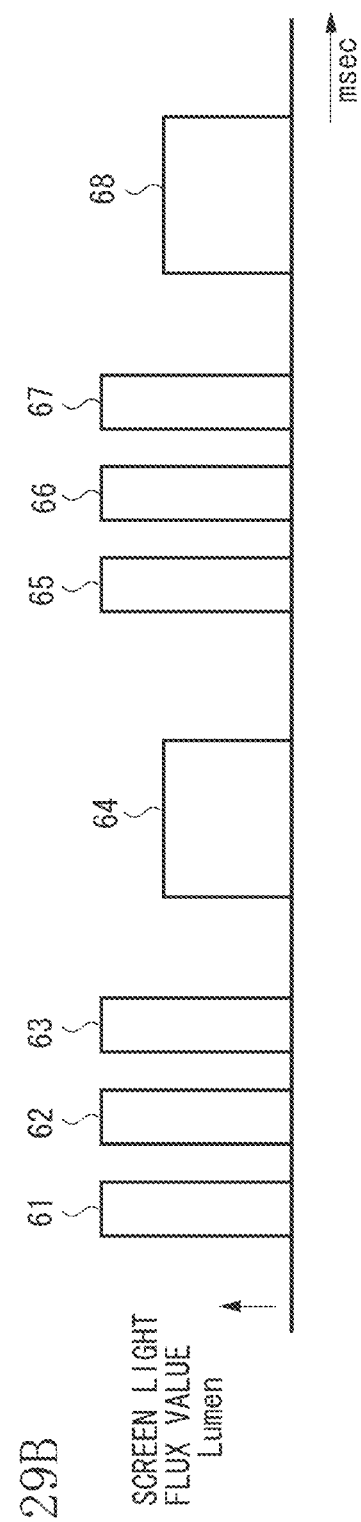

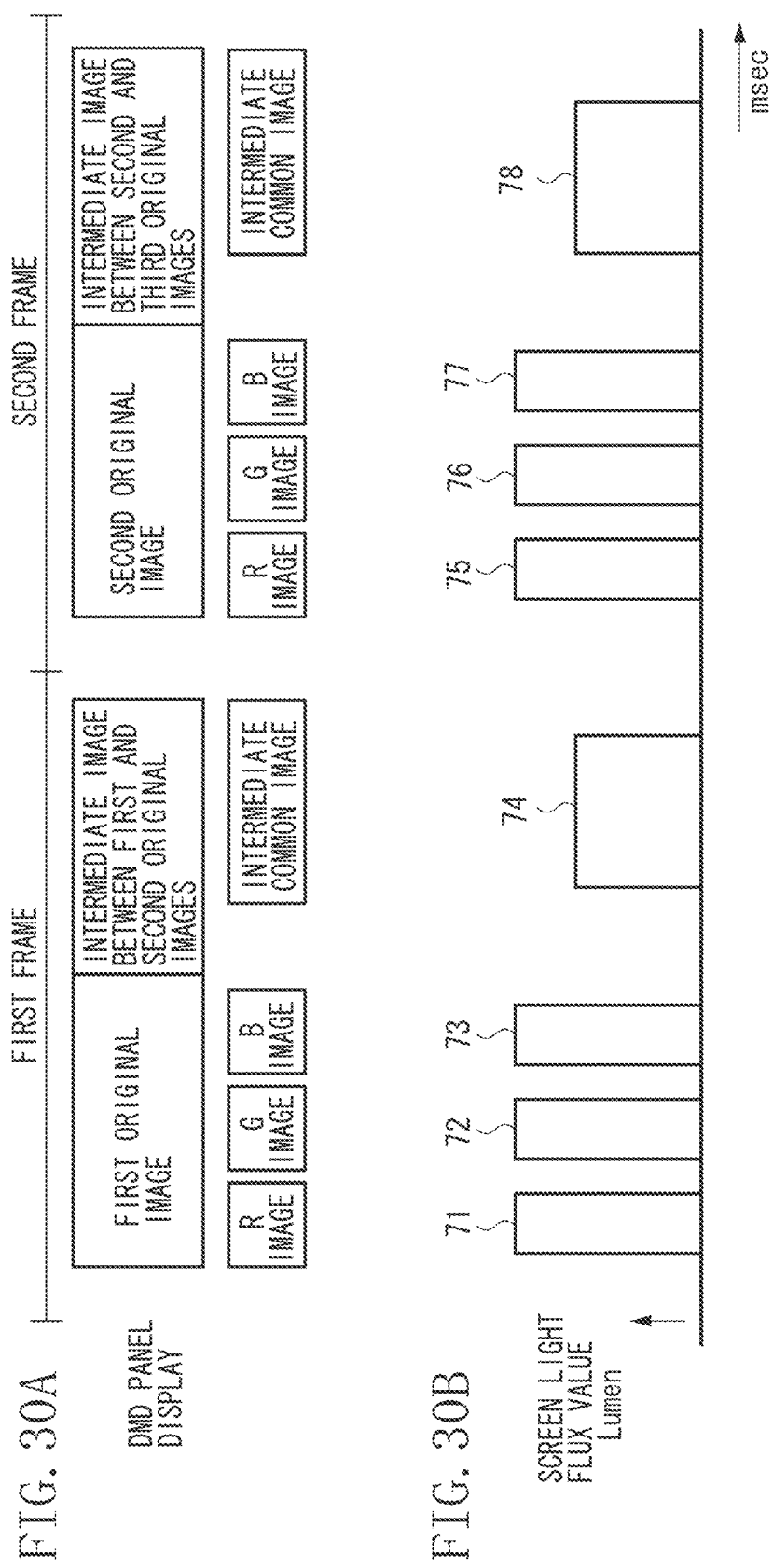

ND PROGRAM THEREFOR

PROJECTION APPARATUS, METHOD FOR CONTROLLING PROJECTION APPARATUS, AND PROGRAM THEREFOR

BACKGROUND OF THE INVENTION

1. Field of the Invention

The present invention relates to a projection apparatus for projecting an image by emitting light from a light source.

2. Description of the Related Art

Conventionally, a projection apparatus performs hold-type display. Hold-type display refers to, for example, continuously displaying the same image in a 16-ms frame duration at a 60-Hz frame frequency.

When displaying a moving image by a direct-view-type display apparatus, such as a television set, performing hold-type display will blur the moving image. A certain technique controls lighting of the backlight to solve this problem. For example, applying a technique for prolonging a black insertion duration enables improving the sharpness of the moving image. However, prolonging the black insertion duration means displaying an image having a 60-Hz frame frequency with a short light emission. In this case, a problem of flicker arises.

For example, Japanese Patent Application Laid-Open No. 2008-70838 discusses a display apparatus which performs a bright light emission for an original image and a dark light emission for an intermediate image. With such a display apparatus, although the above-described problem can be reduced to a certain extent, the image may be disturbed if an intermediate image generation error occurs.

Further, for example, Japanese Patent Application Laid-Open No. 2002-215111 discusses an image display apparatus which performs control to prolong the backlight lighting duration according to a required luminance.

Further, for example, Japanese Patent Application Laid-Open No. 2009-251069 discusses a display panel which performs control to prolong the backlight lighting duration in a period near the center according to a required luminance.

Japanese Patent Application Laid-Open No. 2011-28107 discusses a hold-type image display apparatus which emits light at two different luminance levels, i.e., performs bright and dark light emissions. Such a hold-type image display apparatus is able to reduce the above-described problem. However, if an image having a 60-Hz frame frequency is displayed with a short light emission, flicker occurs. If two short light emissions are performed within one frame to prevent flicker, a double image appears.

If an image is displayed at two different luminance levels as discussed in Japanese Patent Application Laid-Open No. 2011-28107, flicker is caused by the 60-Hz component in addition to the 120-Hz component. Therefore, the difference between the two luminance levels, if it gets larger, increases the amount of the 60-Hz component which generates strong flicker, making it harder for a viewer to watch an image. This means that the difference between the two luminance levels is limited. Further, the difference between the shapes of the original image and the intermediate image will cause a phenomenon of flicker around a displayed object.

However, prolonging the light-emission duration to brighten an image as discussed in Japanese Patent Application Laid-Open No. 2002-215111 causes strong tailing which is called a moving image blur.

Also when a moving image is displayed on a projection apparatus, a blur or flicker occurs similar to a direct-view-type display apparatus. However, it is difficult to apply the above-described techniques as they are to a projection apparatus since these techniques relate to a direct-view-type display apparatus.

SUMMARY OF THE INVENTION

The present invention is directed to reducing the occurrence of flicker and a moving image blur in a projection apparatus for projecting an image of a display unit, which emits light from a light source.

According to an aspect of the present invention, a projection apparatus for projecting an image of a display unit by emitting light from a light source includes a detection unit configured to detect flicker information indicating how easily flicker occurs based on input image information, and a control unit configured to control the number of light emissions of the light source in a time period during which an image in one frame is displayed by the display unit based on the flicker information detected by the detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a light-emission state according to the first exemplary embodiment.

FIGS. 8A to 8E comparatively illustrate image views according to a third exemplary embodiment and other image views.

FIG. 11 illustrates a light-emission state according to the fifth exemplary embodiment.

FIGS. 24A, 24B, and 24C comparatively illustrate image views according to the thirteenth exemplary embodiment and conventional image views.

FIGS. 25A and 25B illustrate light-emission states of LEDs according to the thirteenth exemplary embodiment.

FIGS. 26A and 26B illustrate light-emission states of LEDs according to a fourteenth exemplary embodiment.

FIGS. 27A and 27B illustrate light-emission states of LEDs according to a fifteenth exemplary embodiment.

FIGS. 29A and 29B illustrate light-emission states of the projection apparatus according to the sixteenth exemplary embodiment.

FIGS. 30A and 30B illustrate light-emission states of the projection apparatus according to the seventeenth exemplary embodiment.

DESCRIPTION OF THE EMBODIMENTS

Various exemplary embodiments, features, and aspects of the invention will be described in detail below with reference to the drawings.

Figure 1:
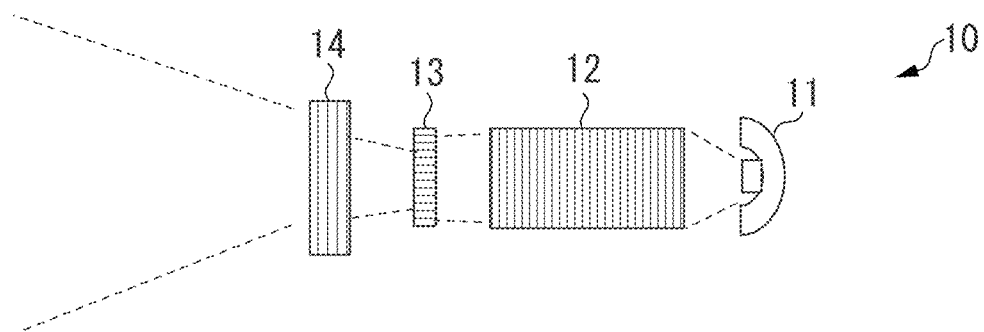
FIG. 1 illustrates an overall configuration of a projection apparatus according to a first exemplary embodiment.

FIG. 1 illustrates an overall configuration of a projection apparatus according to a first exemplary embodiment. A projection apparatus 10 according to the present exemplary embodiment is a liquid crystal projector using a LED as a light source.

The projection apparatus 10 includes a white LED 11 as a light source, a light concentration correction optical system 12, a liquid crystal panel 13 (an example of a display unit) as a spatial modulation element, and a projection lens 14.

The light emitted from the LED 11 and forwardly diffused is condensed and converted into a parallel beam by the light concentration correction optical system 12. The liquid crystal panel 13 receives the parallel beam, modulates it based on an image displayed on the liquid crystal panel 13, and outputs the modulated light. The projection lens 14 magnifies the modulated light and projects the magnified image on a screen (not illustrated).

Figure 2:
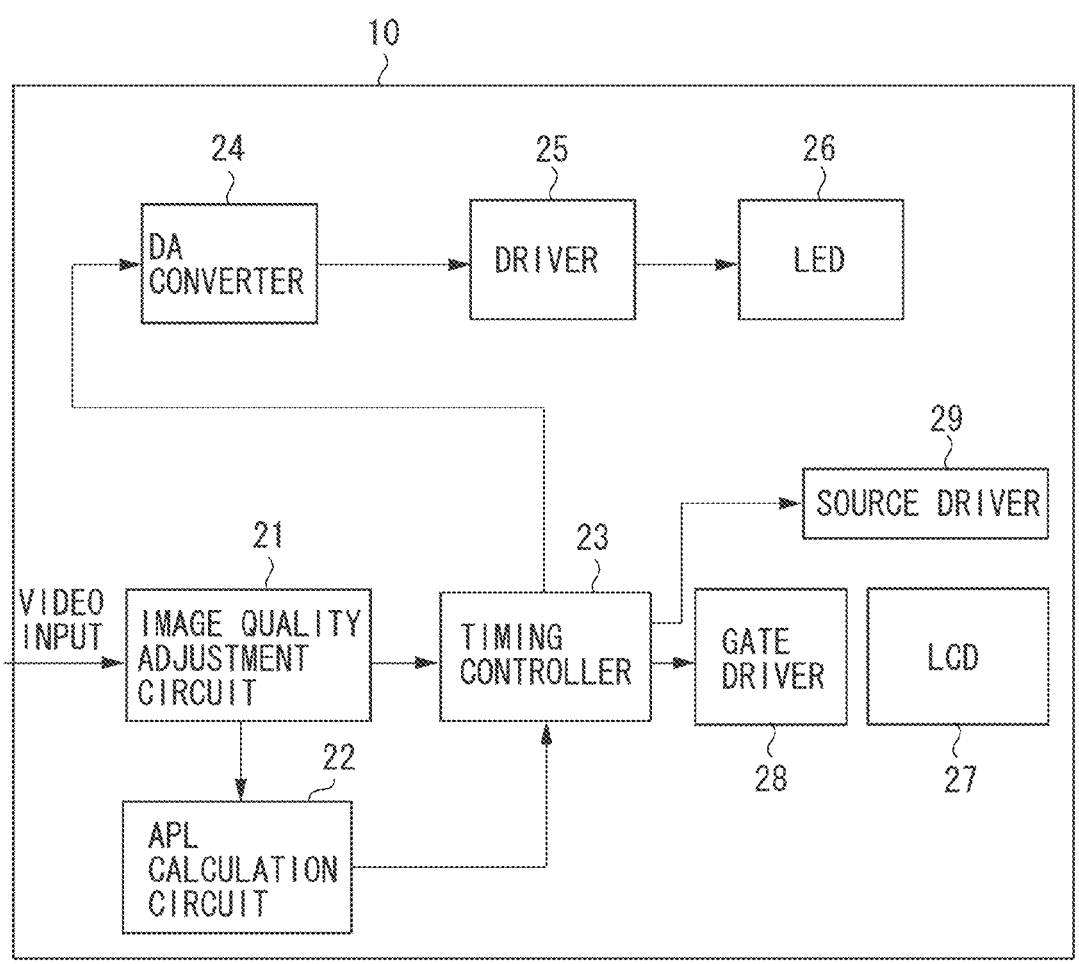
FIG. 2 illustrates an internal configuration of the projection apparatus according to the first exemplary embodiment.

FIG. 2 illustrates an internal configuration of a projection apparatus using an LED 26 and a liquid crystal panel 27.

An image quality adjustment circuit 21 adjusts the image quality of an input image according to the display apparatus and viewer setting values. An average picture level (APL) calculation circuit 22 calculates an APL value. The APL calculation circuit 22 is an example of a detection unit for detecting flicker information indicating how easily flicker occurs. A timing controller 23 controls the timing of the liquid crystal panel 27 and the LED 26. The timing controller 23 is an example of a control unit.

The projection apparatus further includes a digital-to-analog (DA) converter 24, a driver 25 for driving the LED 26 serving as a light source, a liquid crystal panel 27 as a spatial modulation element, a gate driver 28 for driving the liquid crystal panel 27, and a source driver 29 for driving the liquid crystal panel 27.

The following describes overall operations of the projection apparatus 10. The image quality adjustment circuit 21 applies image quality adjustment to video signals (YPbPr signals) which are image information input to the projection apparatus 10, based on the characteristics of the liquid crystal panel 27 and viewer's preferences as parameters, and outputs an optimum image as a red, green, and blue (RGB) signal to the APL calculation circuit 22 and the timing controller 23. The APL calculation circuit 22 calculates the APL value. This processing is an example of processing by an APL value calculation unit. The APL value refers to an average picture level value, and is obtained by averaging gradation values of all pixels of an image to be displayed. The APL calculation circuit 22 calculates a screen light flux value based on the APL value and a maximum light flux value determined by various setting values. The screen light flux value will be described in detail below.

The timing controller 23 transmits to the source driver 29 of the liquid crystal panel 27 digital gradation data indicating voltage values converted from RGB signals. The timing controller 23 transmits a timing signal for scanning at 60 Hz to the gate driver 28. The gate driver 28 and the source driver 29 drive the source and gate electrodes, respectively, of the liquid crystal panel 27 as well as a common electrode (not illustrated) to display an image on the liquid crystal panel 27.

The following describes operations of the LED 26. The timing controller 23 outputs to the DA converter 24 for current value setting, a voltage value equivalent to a current setting value to be applied to the LED 26. For example, in applying a 20-mA current value for a light emission of the LED 26, the voltage value equivalent to the current setting value is 2V. In applying a 4-mA current value for a light emission of the LED 26, the voltage value equivalent to the current setting value is 0.4V.

FIG. 3 illustrates a LED emission state according to the first exemplary embodiment. Referring to FIG. 3, the horizontal axis is assigned an elapsed time, and the vertical axis is assigned the screen light flux value. FIG. 3 illustrates a first light flux 31 when the image is dark, a first light flux 32 when the image is bright, and a second light flux 33 when the image is bright.

The light flux generated by the LED 11 is slightly decreased through the light concentration correction optical system 12, decreased by the average image level (APL value) of display in the liquid crystal panel 13, and then slightly decreased in the projection lens 14.

When the APL value of the original image is small (when the image is dark), the screen light flux value is small. In this case, therefore, flicker does not occur even if one short light emission is performed with the light flux 31 within one frame at a 60-Hz frame frequency.

When the APL value of the original image is large (when the image is bright), the screen light flux value is large. In this case, therefore, flicker may occur if a short light emission is performed within one frame at a 60-Hz frame frequency. Therefore, it is necessary to reduce the occurrence of flicker by performing two light emissions with the light fluxes 32 and 33.

Based on a result of the subjective evaluation, the timing controller 23 determines the display luminance at which two light emissions become necessary, to reduce the occurrence of flicker.

Figure 4A:
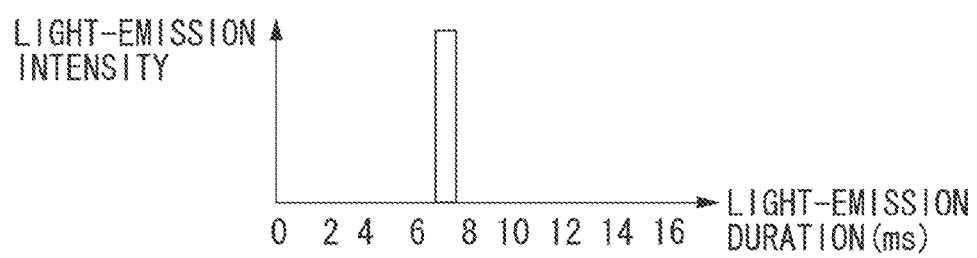
FIGS. 4A, 4B, and 4C illustrate an experiment on a relation between the luminance of a display patch and the subjective flicker evaluation.
Figure 4B:
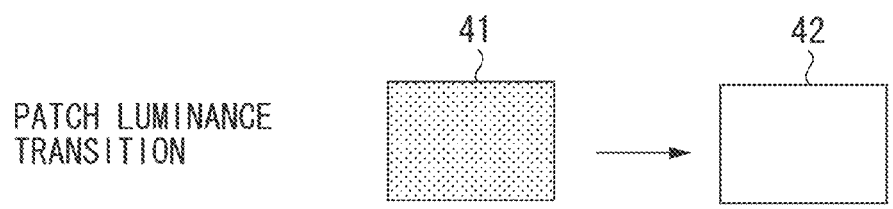
Figure 4C:
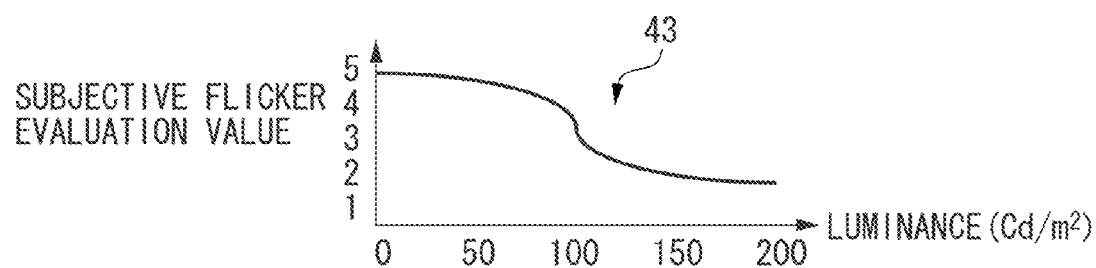

FIGS. 4A to 4C illustrate a result of an experiment on a relation between the luminance of the display patch and the subjective flicker evaluation. FIG. 4A illustrates a relation between the light-emission duration and the light-emission intensity of a display patch. FIG. 4B illustrates a dark patch 41 and a bright patch 42. FIG. 4C is a graph 43 illustrating a result of the subjective evaluation.

The subjective evaluation is based on 5-level evaluation values and the following evaluation criteria: Subjective flicker evaluation values in FIG. 4C
5: The viewer does not feel flicker at all.
4: The viewer feels that slight flicker is present.
3: The viewer feels flicker to a bearable extent.
2: The viewer feels flicker to an unbearable extent.
1: The viewer cannot view because of too strong flicker.

In this experiment, the light-emission intensity and the patch area were set so that a sufficient flicker occurs. The light-emission duration was set to 1 ms at a 60-Hz frame frequency, and the patch area was set to 300 cm$^2$.

Under the above-described display conditions, the luminance of the display patch was determined by changing the gradation of the display patch. Specifically, the gradation was changed to vary the luminance of the display patch from 0 Cd/m$^2$ to 200 Cd/m$^2$ which corresponds to change from the darkest patch 41 to the brightest patch 42. The graph 43 illustrates a result of the experiment on the subjective evaluation.

With this result of the subjective evaluation, we understood that an impulsive light emission having a small duty ratio at a 60-Hz frame frequency provides a subjective evaluation value 4 (tolerance level) or more with a luminance of 70 Cd/m$^2$ or less, and that flicker is permissible in this case.

The timing controller 23 determines the relation between the light flux value and the screen luminance based on the area and reflection factor of the screen as follows:

Luminance=Light flux/(Area×π)×Reflection factor

This formula is written as

Light flux=Luminance×Area×π/Reflection factor

When the screen has a 100-inch diagonal length and a 80% reflection factor as average screen values, the above-described formula becomes Light flux=Luminance×11.8

When the screen has a 80-inch diagonal length and a 90% reflection factor as an installation condition for brighter view, the above-described formula becomes Light flux=Luminance×6.7

Therefore, with a luminance of 70 Cd/m$^2$ or less, as described above, the tolerance level of flicker is about 800 lumen or less on an average basis. Since the installation condition has a certain tolerance level, when the condition for bright view is used, the tolerance level of flicker is 470 lumen≈about 500 lumen or less.

Then, based on another experiment on the subjective evaluation, the projection apparatus 10 determines the ratio of two light-emission intensities (light flux) when performing two light emissions to reduce the occurrence of flicker when the light flux is larger than 500 lumen.

Figure 5A:
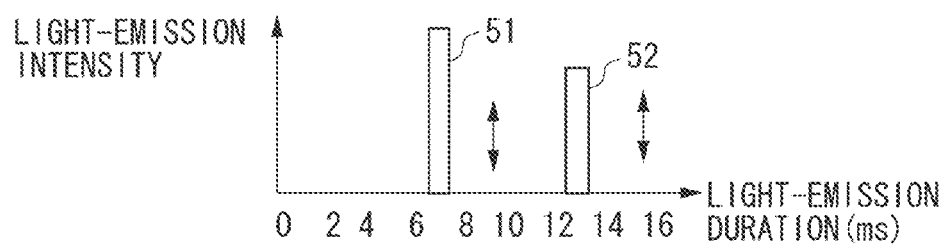
FIGS. 5A, 5B, and 5C illustrate an experiment on a relation between the ratio of two light-emission intensities of the display patch and the subjective flicker evaluation.
Figure 5B:
Figure 5C:
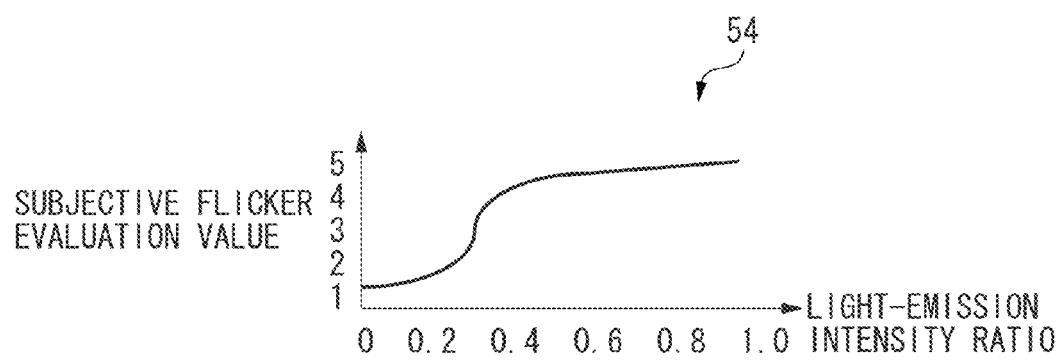

FIGS. 5A to 5C illustrate a result of an experiment on the relation between the ratio of two light-emission intensities of the display patch and the subjective flicker evaluation. FIG. 5A illustrates the relation between the first light-emission duration and a light-emission intensity 51, and the relation between the second light-emission duration and a light-emission intensity 52. FIG. 5B illustrates a display patch 53. FIG. 5C is a graph 54 illustrating a result of the subjective evaluation.

The ratio of the light-emission intensity of the first light emission (hereinafter referred to as first light-emission intensity 51) and the light-emission intensity of the second light emission (hereinafter referred to as second light-emission intensity 52) was changed while maintaining constant the integrated luminance of the display patch by the first and the second light-emission intensities to 200 Cd/m$^2$. The display patch 53 has an area of 300 mm$^2$, and is fully white.

With the result of the subjective evaluation, we understood that the subjective evaluation value is 4 or more when the ratio of the first and the second light-emission intensities is 1.0:0.4 or more, and that flicker is permissible in this case.

To facilitate subsequent calculations, the ratio 1.0:0.4 of the first and the second light-emission intensities is normalized to 0.7:0.3. This value applies to an integrated luminance of 200 Cd/m$^2$. We understood that, when the condition for bright view is employed similar to the above-described case, the ratio of the first and the second light-emission intensities is desirably set to 0.7:0.3 when 1340 lumen≈about 1300 lumen.

Based on the result of the above-described experiment on the subjective evaluation, the ratio of the first and the second light-emission intensities is set as follows:
Two light emissions provide a total display light flux value of D (lumen).
(Case 1) D≤500 lumen
First light-emission intensity: 1.0
Second light-emission intensity: 0.0
(Case 2) 500 lumen<D<1300 lumen
First light-emission intensity: 1.0−0.3×(D−500)/900
Second light-emission intensity: 0.3×(D−500)/900
(Case 3) D≥1300 lumen
First light-emission intensity: 0.7
Second light-emission intensity: 0.3

The maximum light-emission intensity of the LED is determined by setting values and mode of the projection apparatus 10, and the maximum light flux value is determined by closing the diaphragm.

For example, in the PC mode of the projection apparatus 10 having a maximum light flux value of 2000 lumen, the display light flux value can be set, for example, between 1000 and 2000 lumen in the luminance setting. In the movie mode, the display light flux value can be set, for example, between 300 and 1000 lumen. To increase the dark portion contrast, the diaphragm may be controlled based on the APL value so that the screen dynamically becomes dark. In this case, when the maximum light flux value is 1000 lumen and the minimum light flux value is, for example, one eighth of the maximum light flux value, the display light flux value changes between 125 lumen and 1000 lumen. The APL calculation circuit 22 multiplies the APL value by the maximum light flux value to obtain the display light flux value. This processing is an example of processing by the display light flux value calculation unit. The display light flux value is an example of flicker information, which serves as an index indicating how easily flicker occurs. Thus, regardless of whether the display light flux value is a fixed value or a dynamically changing value, the projection apparatus 10 controls the first and the second light-emission intensities according to the display light flux value in each case.

The screen light flux value is an instantaneous light flux value, and the integrated regular light flux value is as follows:

Light flux value=Screen light flux value/Duty

The duty refers to the ratio of light-emission duration.

The display light flux value changes along with the image content as follows:

Display light flux value=Screen light flux value× APL

The light-emission intensity is the ratio to the maximum light-emission intensity.

Figure 6:
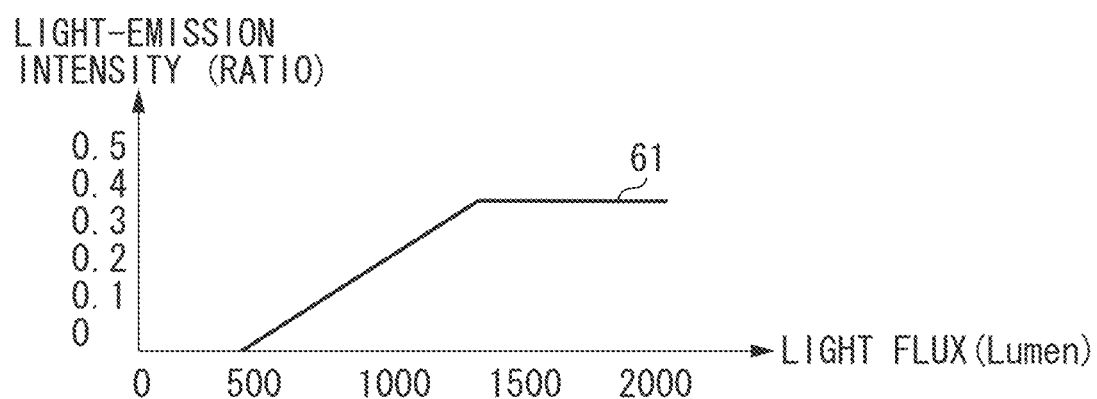
FIG. 6 illustrates a relation between the display light flux value and the light-emission intensity ratio according to the first exemplary embodiment.

FIG. 6 illustrates a relation between the display light flux value and the light-emission intensity ratio according to the first exemplary embodiment. Referring to FIG. 6, the horizontal axis is assigned the display light flux value, and the vertical axis is assigned the ratio of second light-emission intensity to the first light-emission intensity which is 1.0. FIG. 6 illustrates a control line 61 for determining the ratio of the first and the second light-emission intensities based on the display light flux value. The control line 61 linearly connects the ratio between the above-described (Case 1) and (Case 3), where the light-emission intensity ratio is between 500 lumen and 1300 lumen. The control line 61 is not limited to the linear line. It may be a curved one.

The timing controller 23 compares the display light flux value calculated by the APL calculation circuit 22 with the control formulas in (Case 1) to (Case 3) or with the control line 61 illustrated in FIG. 6 to acquire the ration between the number of light emissions and the light-emission intensity as control values. The timing controller 23 controls the LED 26 by using the acquired control values. Specifically, when the display light flux value is small, the timing controller 23 controls the LED 26 to perform one light emission. When the display light flux value is large, it controls the LED 26 to perform two light emissions. When the display light flux value is large, the timing controller 23 changes the ratio of the first and the second light-emission intensities according to the display light flux value. By performing such processing for each frame, flicker and a motion blur of the displayed moving image can be reduced. The above-described control formulas in (Case 1) to (Case 3) or the control line 61 illustrated in FIG. 6 are prestored in the timing controller 23.

Thus, according to the present exemplary embodiment, by controlling the number of LED light emissions in a time period during which the image in one frame is displayed, according to how easily flicker occurs, the occurrence of flicker and a motion blur can be reduced. Further, when causing the LED to emit twice, by controlling the ratio of the first and the second light-emission intensities according to how easily flicker occurs, the flicker occurrence can be reliably reduced.

The following describes a second exemplary embodiment focusing on a relation between an image and a LED light emission in a case where an intermediate image is generated from the original image having a 60-Hz frame frequency and displayed at a 120-Hz frame frequency. The present exemplary embodiment uses the projection apparatus 10 according to the first exemplary embodiment.

Figure 7:
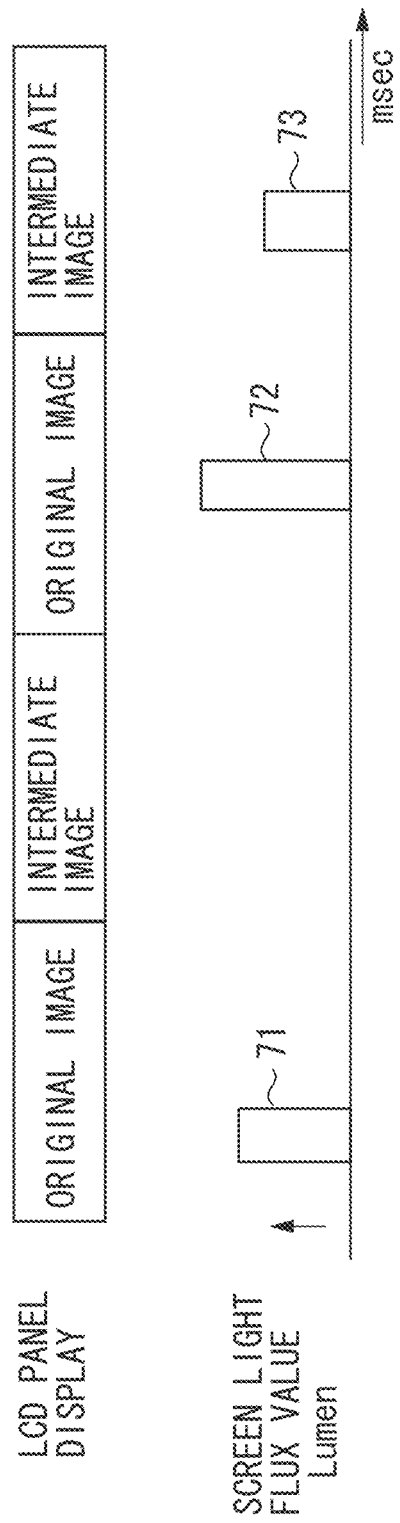
FIG. 7 illustrates a light-emission state according to a second exemplary embodiment.

FIG. 7 illustrates a LED emission state according to the second exemplary embodiment. Referring to FIG. 7, the horizontal axis is assigned the elapsed time, and the vertical axis is assigned the screen light flux value. FIG. 7 illustrates a light flux 71 of the original image when the image is dark, a light flux 72 of the original image when the image is bright, and a light flux 73 of the intermediate image when the image is bright.

When the original image is dark, the screen light flux value is small similar to the first exemplary embodiment. In this case, therefore, flicker does not occur even if one short light emission is performed by using the light flux 71 within one frame at a 60-Hz frame frequency.

Otherwise, when the original image is bright, the screen light flux value is large. In this case, therefore, flicker may occur if a short light emission is performed within one frame at a 60-Hz frame frequency. Therefore, it is necessary to reduce the occurrence of flicker by performing two light emissions with the light flux 72 of the original image and the light flux 73 of the intermediate image. The intermediate image may be generated by the timing controller 23 or by an image generation circuit (not illustrated).

The second exemplary embodiment uses an intermediate image and therefore provides image display having less motion blur than the first exemplary embodiment. In the present exemplary embodiment, even if an intermediate image generation error occurs, the second light emission is not performed or restrained to about 40% of the first light emission. Thus, the viewer does not easily feel image disorders due to an intermediate image generation error.

Figure 8D:
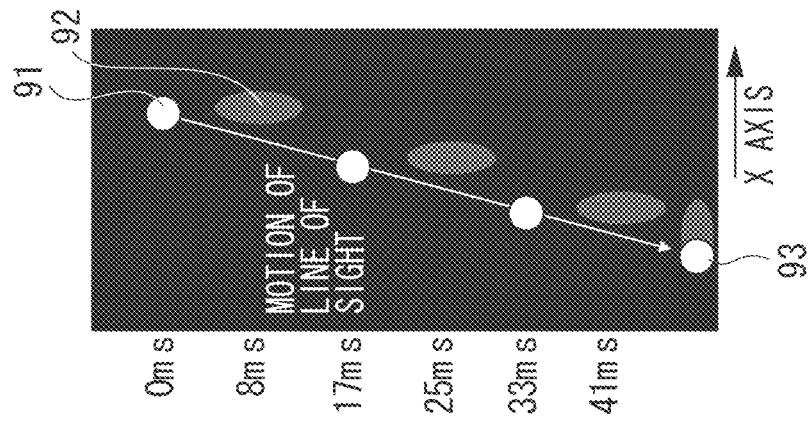
Figure 8E:
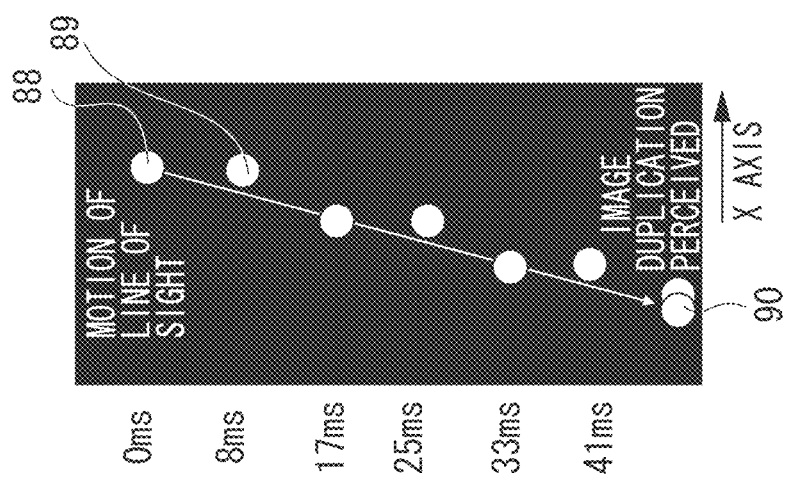

The following describes image views according to a third exemplary embodiment with reference to FIGS. 8A to 8E. The present exemplary embodiment uses the projection apparatus 10 according to the first exemplary embodiment. FIGS. 8A to 8E comparatively illustrate image views according to the present exemplary embodiment and other image views. FIG. 8A illustrates an image view by an impulsive light emission at a 60-Hz frame frequency. FIG. 8B illustrates an image view by a hold light emission with black insertion at a 60-Hz frame frequency. FIG. 8C illustrates an image view by two (bright and dark) hold light emissions having different luminance levels. FIG. 8D illustrates an image view by two impulsive light emissions. FIG. 8E illustrates an image view by two light emissions according to the present exemplary embodiment. Referring to each of FIGS. 8A to 8E, a displayed spherical object (hereinafter referred to as a sphere) is moving from right to left for each frame. The vertical axis is assigned time. In the case of an image having a 60-Hz frame frequency, the image changes at intervals of 16.67 ms. The arrow head indicates the movement of the line-of-sight. The image at the bottom is a result of combination of the images along with the movement of the line-of-sight (an image viewed by the viewer).

FIG. 8A illustrates impulsive light emissions. A shape 81 is a sphere image appearing within one frame by an impulsive light emission. A shape 82 is a sphere image appearing in combined several frames by an impulsive light emission. FIG. 8B illustrates hold light emissions. A shape 83 is a sphere image appearing within one frame by a hold light emission. A shape 84 is a sphere image appearing in combined several frames by a hold light emission. FIG. 8C illustrates hold light emissions. A shape 85 is a sphere image appearing within one frame by a bright hold light emission. A shape 86 is a sphere image appearing within one frame by a dark hold light emission. A shape 87 is a sphere image appearing in combined several frames by a hold light emission. FIG. 8D illustrates impulsive light emissions. A shape 88 is a sphere image appearing within one frame by the first impulsive light emission. A shape 89 is a sphere image appearing within one frame by the second impulsive light emission. A shape 90 is a sphere image appearing in combined several frames by an impulsive light emission. FIG. 8E illustrates light emissions according to the present exemplary embodiment. A shape 91 is a sphere image appearing within one frame by a bright impulsive light emission. A shape 92 is a sphere image appearing within one frame by a dark hold light emission. A shape 93 is a sphere image appearing in combined several frames by a light emission according to the present exemplary embodiment.

In the case illustrated in FIG. 8A, only the first light-emission duration is displayed for each frame by an impulsive light emission. Each image looks like a sphere, as illustrated by the shape 81. An image appearing in combined several frames looks like a sphere, as illustrated by the shape 82. Therefore, this case provides the most desirable image views for a moving object. However, when an impulsive light emission is performed at a 60-Hz frame frequency, severe flickers occur disturbing bright display.

In the case illustrated in FIG. 8B, only the first light-emission duration is displayed for each frame by a hold light emission. The light-emission duration is long, as illustrated by the shape 83 (image display by a hold-type light emission). When several frames are added along with the movement of the line-of-sight, the shape is changed to an ellipse, as illustrated by the shape 84. Such a change in shape is unavoidable although black insertion is performed so that the hold duration is halved to improve the shape to a certain extent. If the black insertion duration is prolonged, the change in shape can be prevented. However, the light-emission state comes close to an impulsive light emission, and therefore severe flicker occurs similar to the case in FIG. 8A.

To prevent the occurrence of flicker, two light emissions are performed within one frame as follows. In the case illustrated in FIG. 8C, the shape 85 appears by a bright hold light emission for the first light-emission duration, and the shape 86 appears by a dark hold light emission for the second light-emission duration. The shape 87 appearing as a combination of the shapes 85 and 86 along the movement of the line-of-sight looks like a bright ellipse and a dark ellipse like tailing. In the case illustrated in FIG. 8D, an impulsive light emission is performed so that the image view looks like a sphere. The shape 88 appearing by the first impulsive light emission looks like a sphere. Although the shape 89 appearing by the second impulsive light emission looks like a sphere, the shape 89 is displayed with a time delay and therefore becomes out of the movement of the line-of-sight. The shape 90 appearing as a combination of the shapes 88 and 89 along the movement of the line-of-sight looks like a double sphere. This phenomenon is called a double blur which is not desirable from the viewpoint of the image quality. FIG. 8E illustrates an image view according to the present exemplary embodiment. Referring to FIG. 8E, the shape 91 appearing by the first bright impulsive light emission looks like a sphere. The shape 92 appearing by the second dark hold light emission looks like a dark ellipse. The shape 93 appearing as a combination of the shapes 91 and 92 along the movement of the line-of-sight looks like a bright sphere and a trailing dark ellipse. More specifically, the viewer watches a bright shape which is the same as the moving shape, and a trailing dark image, such as tailing. The shape 93 appears neither as a changed shape like the shapes 84 and 87 nor as a double image like the shape 90. Although dark tailing appears with the shape 93, this image display is natural as a view of a movement of an object, and permissible by the viewer.

Figure 9:
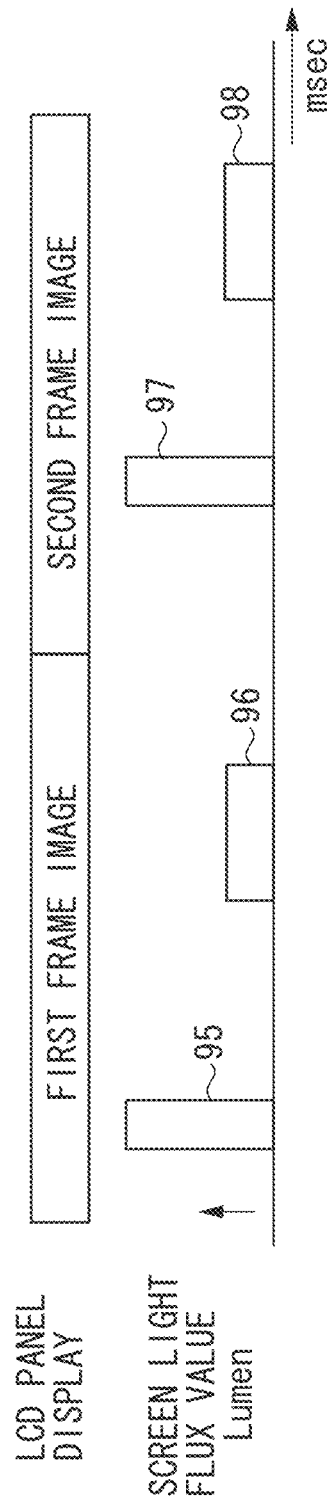
FIG. 9 illustrates a light-emission state according to the third exemplary embodiment.

FIG. 9 illustrates a LED emission state according to the third exemplary embodiment. Referring to FIG. 9, the horizontal axis is assigned the elapsed time, and the vertical axis is assigned the screen light flux value. FIG. 9 illustrates a bright short light flux 95 of the original image in the first frame, a dark long light flux 96 of the original image in the first frame, a bright short light flux 97 of the original image in the second frame, and a dark long light flux 98 of the original image in the second frame.

The image display as illustrated in FIG. 8E can be obtained by performing a bright short light emission and a dark long light emission of the LED 11 within one frame, as illustrated in FIG. 9. This image display is more natural than that illustrated in the first exemplary embodiment as a view of a movement of an object, and permissible by the viewer.

The following describes a fourth exemplary embodiment as a combination of the second and the third exemplary embodiments. The present exemplary embodiment uses the projection apparatus 10 according to the first exemplary embodiment. In the fourth exemplary embodiment, the projection apparatus 10 displays an original image and an intermediate image alternately similar to the second exemplary embodiment, and the LED 11 repetitively emits a bright short light flux and a dark long light flux similar to the third exemplary embodiment. Specifically, the LED 11 emits a bright short light flux to display the original image, and a dark long light flux to display the intermediate image.

Displaying the images in this way sharpens the original image and blurs the intermediate image, obscuring image disorders due to an intermediate image generation error. Further, since a 120-Hz light emission is performed in total, flicker does not occur.

Although the projection apparatus 10 according to the description of the first to the fourth exemplary embodiments uses the white LED 11 as a light source, the light source is not limited thereto. For example, by using the 3-color (RGB) LEDs as light sources, spatial modulation elements, such as three liquid crystal displays (LCDs) may be used for respective colors. Similar effects can be obtained when performing light source control described in the first to the fourth exemplary embodiments.

The following describes a projection apparatus using a lamp as a light source, according to a fifth exemplary embodiment. Using a lamp as a light source makes it more difficult to quickly control the light quantity than using a LED as a light source. The following describes a configuration of a projection apparatus using a lamp as a light source, and a method for controlling the projection apparatus.

Figure 10A:
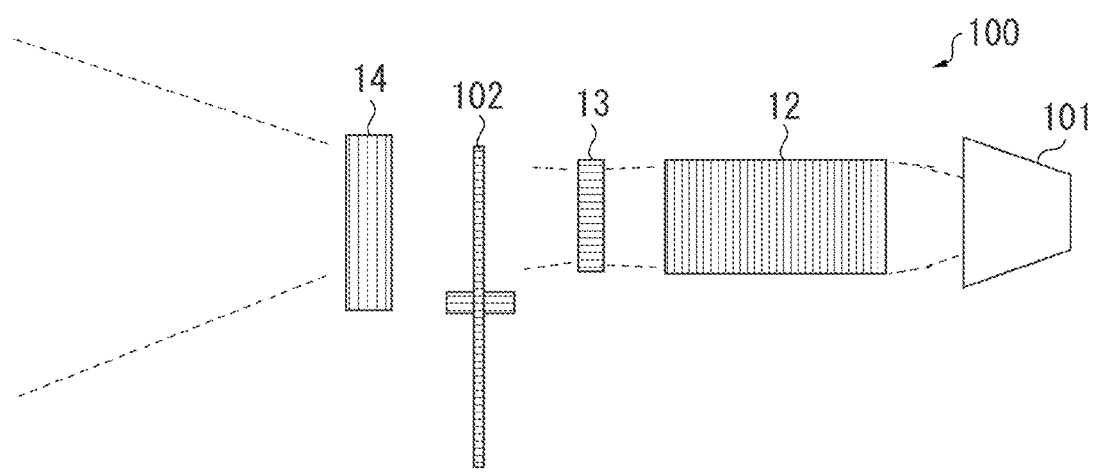
FIGS. 10A and 10B illustrate an overall configuration of a projection apparatus according to a fifth exemplary embodiment.
Figure 10B:
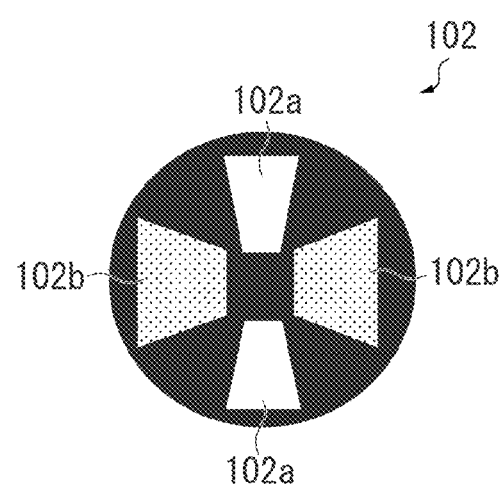

FIG. 10A illustrates an overall configuration of the projection apparatus according to the fifth exemplary embodiment. FIG. 10B is a front view illustrating the configuration of a rotary wheel 102. The projection apparatus 100 according to the present exemplary embodiment is a liquid crystal projector using a lamp as a light source together with the rotary wheel 102.

The projection apparatus 100 includes a lamp 101 as a light source, a light concentration correction optical system 12, a liquid crystal panel 13 as a spatial modulation element, the rotary wheel 102 rotated by a rotary motor, and a projection lens 14.

As illustrated in FIG. 10B, the rotary wheel 102 is provided with two transparent portions (first light-transmission portions) 102a having a narrow slit spacing, and two half-gray portions (second light-transmission portions) 102b having a wide slit spacing. The four transparent portions are circumferentially arranged at predetermined distances. The transparent portions 102a have larger light transmissivity than the half-gray portions 102b. The rotary wheel 102 is based on a 2-period configuration. More specifically, while the rotary wheel 102 performs one rotation, the two transparent portions 102a and the two half-gray portions 102b pass between the liquid crystal panel 13 and the projection lens 14 twice. The configuration of the rotary wheel 102 is not limited to the above-described 2-period configuration. If the number of periods per rotation of the rotary wheel 102 is increased, for example, 3-period or larger-number-period configuration is employed, the number of rotations of the rotary wheel 102 can be reduced. The timing controller 23 rotates the rotary wheel 102 via the rotary motor in synchronization with the display timing.

The light emitted from the lamp 101 and forwardly diffused is condensed and converted into a parallel beam by the light concentration correction optical system 12. The parallel beam is input to the liquid crystal panel 13, modulated based on the image displayed on the liquid crystal panel 13, and output therefrom. Out of the modulated light, only the light which has passed through the transparent portions 102a or the half-gray portions 102b of the rotary wheel 102 is emitted to the projection lens 14. The light magnified by the projection lens 14 is projected on a screen (not illustrated). The interior portion of the projection apparatus 100 is configured by replacing the LED of the projection apparatus 100 illustrated in FIG. 2 with the lamp 101.

FIG. 11 illustrates a light-emission state of the projection apparatus 100 according to the fifth exemplary embodiment. Referring to FIG. 11, the horizontal axis is assigned the elapsed time, and the vertical axis is assigned the screen light flux value. FIG. 11 illustrates a bright short light flux 111 of the original image in the first frame, a dark long light flux 112 of the original image in the first frame, a bright short light flux 113 of the original image in the second frame, and a dark long light flux 114 of the original image in the second frame. The light fluxes 111 and 113 are those which have passed through respective transparent portions 102a, and the light fluxes 112 and 114 are those which have passed through respective half-gray portions 102b.

It is difficult to control light quantity of the lamp 101 in a short time as with the LED 11. Therefore, the projection apparatus 100 according to the present exemplary embodiment achieves short bright light-emission states and long dark light-emission states by rotating the rotary wheel 102. Therefore, the image display as illustrated in FIG. 8E can also be obtained according to the present exemplary embodiment.

The lamp 101 has a larger light quantity than the LED 11. Therefore, even if a reduced light quantity due to the rotary wheel 102 is taken into consideration, the projection apparatus using the lamp 101 according to the present exemplary embodiment is able to provide brighter projection than the projection apparatus using the LED 11.

The following describes image display achieved by using an intermediate image, according to a sixth exemplary embodiment. The present exemplary embodiment uses the projection apparatus 100 according to the fifth exemplary embodiment.

Figure 12:
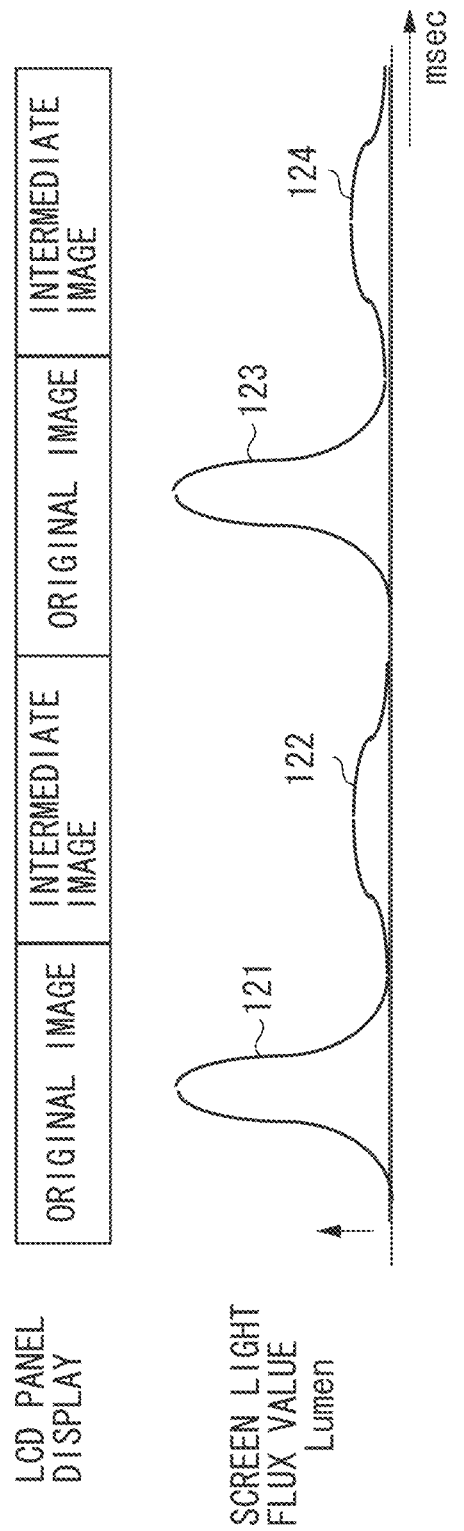
FIG. 12 illustrates a light-emission state according to a sixth exemplary embodiment.

FIG. 12 illustrates a light-emission state of the projection apparatus 100 according to the sixth exemplary embodiment. Referring to FIG. 12, the horizontal axis is assigned the elapsed time, and the vertical axis is assigned the screen light flux value. FIG. 12 illustrates a bright short light flux 121 of the original image in the first frame, a dark long light flux 122 of the intermediate image in the first frame, a bright short light flux 123 of the original image in the second frame, and a dark long light flux 124 of the intermediate image in the second frame. The light fluxes 121 and 123 are those which have passed through respective transparent portions 102a, and the light fluxes 122 and 124 are those which have passed through respective half-gray portions 102b.

Since the sixth exemplary embodiment uses an intermediate image, an image can be displayed with less moving image blur than the fifth exemplary embodiment.

Even the projection apparatus 100 using the lamp 101 as a light source in this way can achieve short bright light-emission states and long dark light-emission states. Since tailing by a long dark light emission appears, the viewer feels that the image display is natural as a view of a movement of an object.

Figure 13:
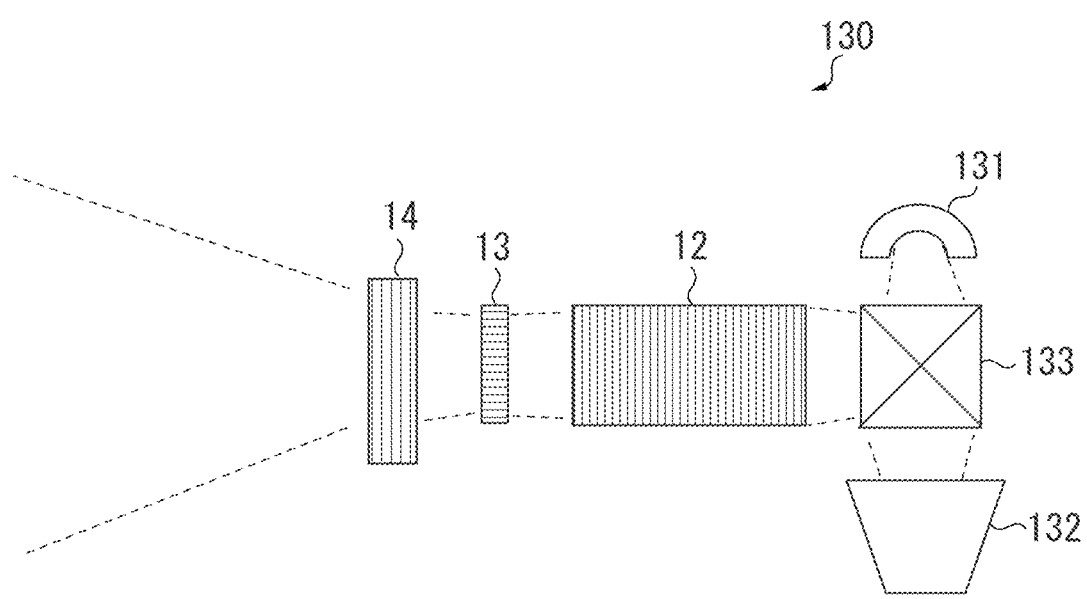
FIG. 13 illustrates an overall configuration of a projection apparatus according to a seventh exemplary embodiment.

The following describes a projection apparatus 130 of the hybrid light source type using a lamp and a LED as light sources, according to a seventh exemplary embodiment. FIG. 13 illustrates an overall configuration of the projection apparatus 130 according to the seventh exemplary embodiment. The projection apparatus 130 according to the present exemplary embodiment is a liquid crystal projector using a lamp (first light source) and a LED (second light source) as light sources.

The projection apparatus 130 includes a white LED 131 as a light source, a lamp 132 as a light source, a prism 133 for combining light from two different directions, a light concentration correction optical system 12, a liquid crystal panel 13 as a spatial modulation element, and a projection lens 14. The projection apparatus 130 can acquire a light flux having desired conditions by combining light of both the LED 131 and the lamp 132. The following describes light fluxes in detail. The interior portion of the projection apparatus 130 is configured by adding the lamp 132 in parallel with the LED 26 of the projection apparatus 10 illustrated in FIG. 2.

Figure 14:
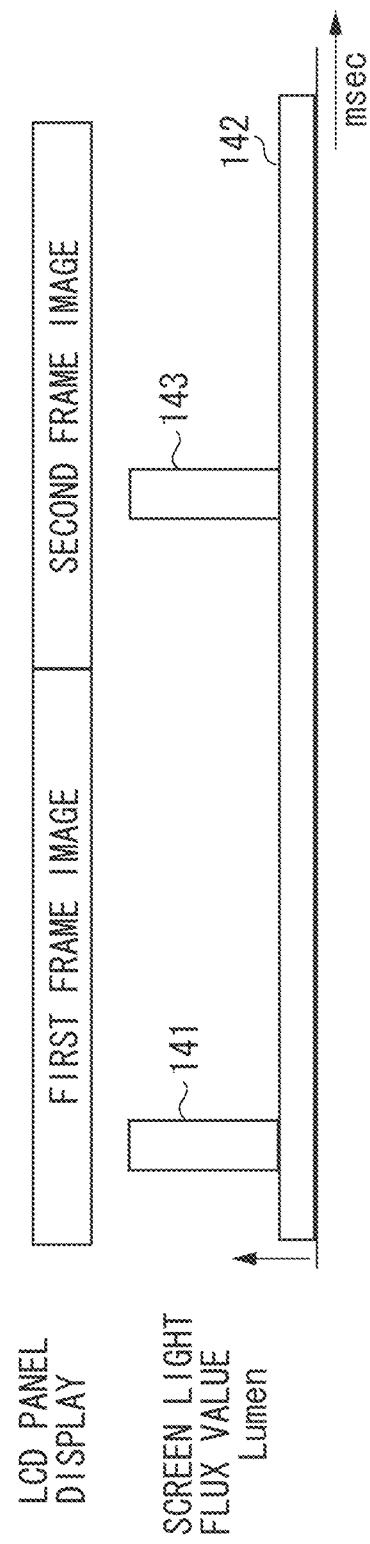
FIG. 14 illustrates a light-emission state according to the seventh exemplary embodiment.

FIG. 14 illustrates a light-emission state according to the seventh exemplary embodiment. Referring to FIG. 14, the horizontal axis is assigned the elapsed time, and the vertical axis is assigned the screen light flux value. FIG. 14 illustrates a bright short light flux 141 of the LED 131 for the original image in the first frame, a dark continuous light emission 142 of the lamp 132, and a bright short light flux 143 of the LED 131 for the original image in the second frame. It is necessary that the LED 131 emits light in the first half of one frame.

The timing controller 23 controls the lamp 132 to constantly emit light to produce about one third to about four fifths of the total light quantity, and controls the LED 131 to instantaneously emit light to produce about one fifth to about one third of the total light quantity. Controlling light emissions of the lamp 132 and the LED 131 in this way provides a viewer with a sum of light emissions of the two light sources. At an image portion where the object is moving, the viewer watches a sharp image made by the LED 131 and then tailing by the lamp 132 added thereto. With this view, the viewer feels that such image display is natural as a view of a movement of an object.

The viewer watches an image in this way because the LED 131 emits light in the first half of one frame. If the LED 131 emits light in the last half of one frame, the tailing component made by the lamp 132 appears on the front side of the movement of an object, and the viewer feels it unnatural.

Although a short light emission of the LED 131 alone may cause flicker, a continuous light emission of the lamp 132 enables reducing the occurrence of flicker.

Based on the result of the subjective evaluation illustrated in FIG. 5C, the ratio of the light flux by a light emission of the LED 131 and the light flux by a light emission of the lamp 132 per frame (hereinafter referred to as ratio LED: lamp) is basically set to 0.33:0.67. However, when the movement characteristics are thought important, the timing controller 23 sets the ratio LED:lamp to 0.67:0.33. When flicker prevention is thought important, the timing controller 23 can change the ratio of LED:lamp to 0.2:0.8.

The following describes image display achieved by using an intermediate image, according to an eighth exemplary embodiment. The present exemplary embodiment uses the projection apparatus 130 according to the seventh exemplary embodiment.

Figure 15:
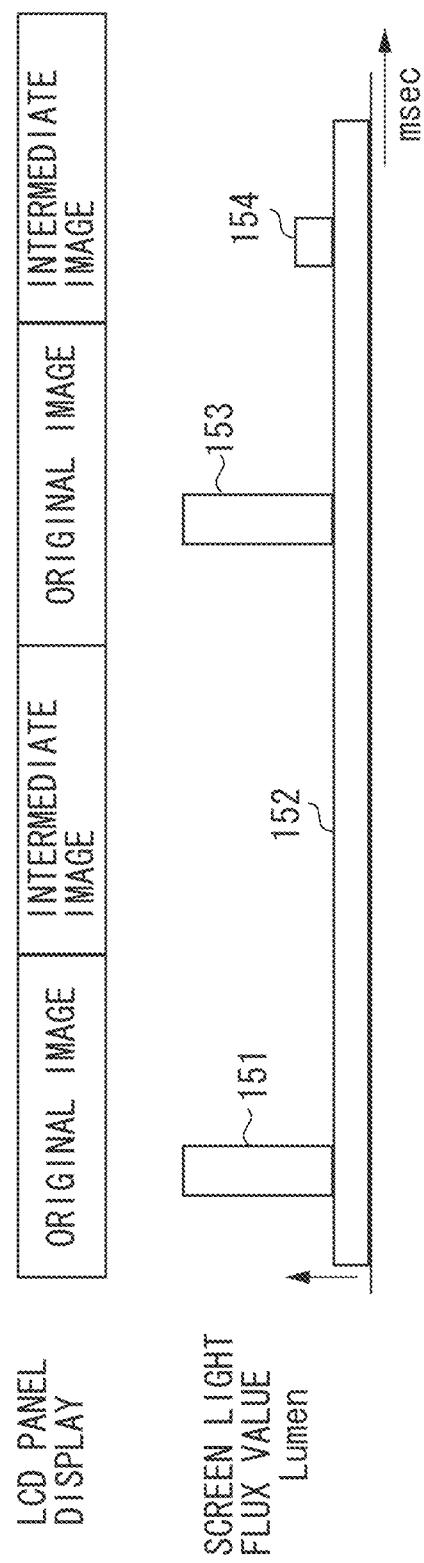
FIG. 15 illustrates a light-emission state according to an eighth exemplary embodiment.

FIG. 15 illustrates a light-emission state of the projection apparatus 130 according to the eighth exemplary embodiment. Referring to FIG. 15, the horizontal axis is assigned the elapsed time, and the vertical axis is assigned the screen light flux value. FIG. 15 illustrates a bright short light flux 151 of the LED 131 for the original image in the first frame, a dark continuous light emission 152 of the lamp 132, a bright short light flux 153 of the LED 131 for the original image in the second frame, and a dark short light flux 154 of the LED 131 for the intermediate image in the second frame. In this case, a dark short light emission is performed once for each intermediate image in the second frame.

Referring to the light emission timing of the LED 131, as illustrated in FIG. 15, the LED 131 emits light for the original image, and does not emit light for the intermediate image or darkly emits light.

The projection apparatus 130 according to the eighth exemplary embodiment uses an intermediate image and therefore provides smaller tailing than the projection apparatus 130 according to the seventh exemplary embodiment does. Similar to the second and the sixth exemplary embodiments, image disorders due to an intermediate image generation error is obscured. Controlling the LED 131 to darkly emit light as with the light flux 154 illustrated in FIG. 15 enables further reducing the occurrence of flicker than the seventh exemplary embodiment.

Figure 16:
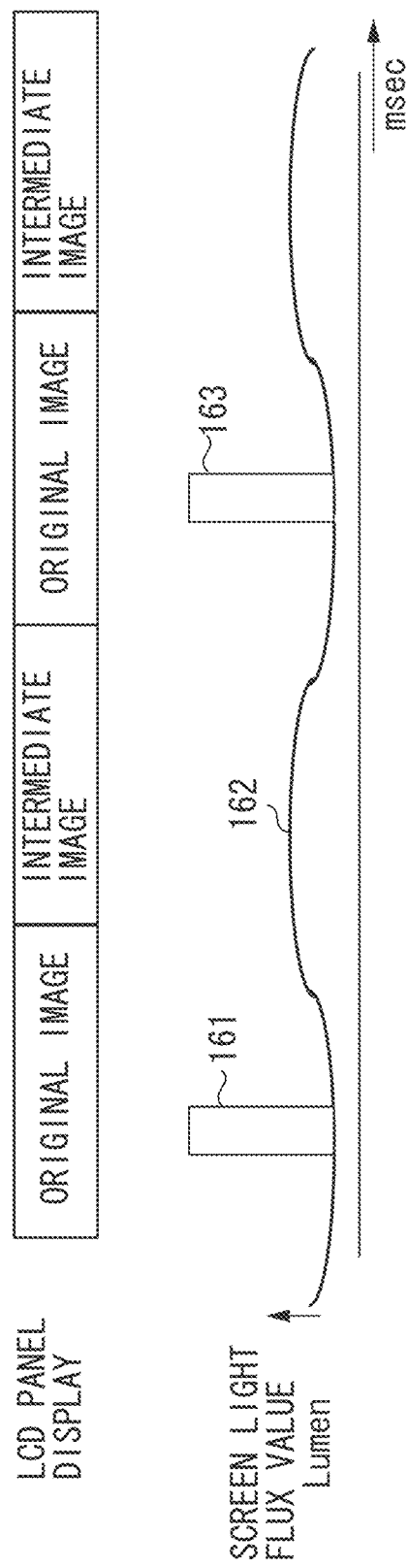
FIG. 16 illustrates a light-emission state according to a ninth exemplary embodiment.

The following describes a ninth exemplary embodiment according to which the occurrence of flicker is reduced by pulsating the light flux of a lamp light source. The present exemplary embodiment uses the projection apparatus 130 according to the seventh exemplary embodiment. FIG. 16 illustrates a light-emission state of the projection apparatus 130 according to the ninth exemplary embodiment.

Referring to FIG. 16, the horizontal axis is assigned the elapsed time, and the vertical axis is assigned the screen light flux value. FIG. 16 illustrates a bright short light flux 161 of the LED 131 for the original image in the first frame, a pulsating light emission 162 of the lamp 132, and a bright short light flux 163 of LED 131 for the original image in the second frame.

As illustrated in FIG. 16, the light emission timing of the LED 131 is such that the LED 131 emits light for the original image, and does not emit light for the intermediate image. As illustrated in FIG. 16, the lamp 132 is controlled to perform a pulsating light emission by slightly darkly emitting light for the original image, and slightly brightly emitting light for the intermediate image.

The following describes in detail the ratio of the dark light flux and the bright light flux in the pulsating light emission. For example, in the case of the ratio of LED:lamp=0.33:0.67 (the average light flux of the lamp 132 is 0.67), the ratio of the dark light flux and the bright light flux=0.4:0.6 can be replaced with the ratio of the dark light flux and the bright light flux=0.27:0.4. Then, the following formula is given.

LED+Dark light flux of lamp=0.33+0.27=0.6

Bright light flux of lamp=0.4

Based on the result of calculation, the ratio of the light flux of the original image and the light flux of the intermediate image is 0.6:0.4, i.e., 1.0:0.67. Therefore, flicker does not occur with reference to the result of the subjective evaluation illustrated in FIG. 5C.

For example, in the case of the ratio of LED:lamp=0.5: 0.5, the ratio of the light flux of the original image and the light flux of the intermediate image is 0.7:0.3, i.e., 1.0:0.42 as a result of similar calculation. Therefore, flicker does not occur with reference to the result of the subjective evaluation illustrated in FIG. 5C.

In the ninth exemplary embodiment, the lamp 132 is controlled to emit pulsating light to enable reducing the occurrence of flicker due to a light emission of the LED 131.

In the above-described seventh to the ninth exemplary embodiments, the total light quantity can be increased by using both the lamp 132 and the LED 131 as light sources. If the lamp 132 blows, projection only with the LED 131 is possible on an urgent basis.

Figure 17:
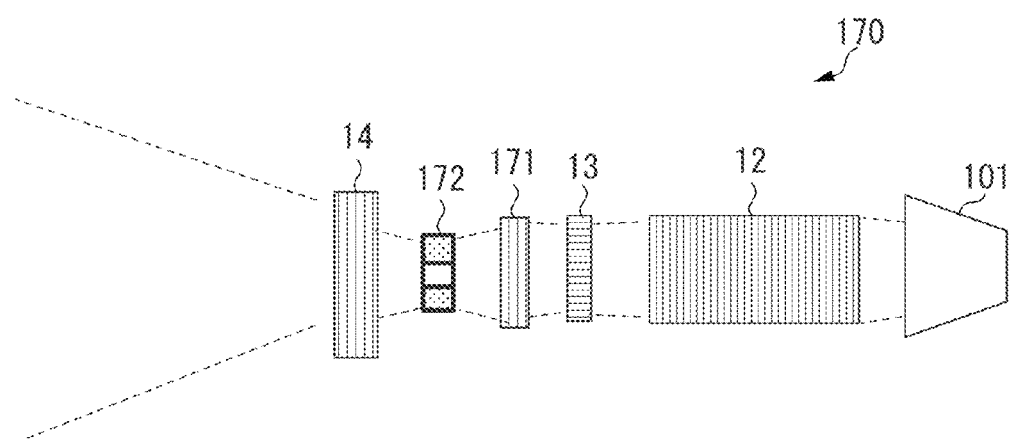
FIG. 17 illustrates an overall configuration of a projection apparatus according to a tenth exemplary embodiment.

The following describes a projection apparatus 170 which dynamically controls opening and closing of the diaphragm, according to a tenth exemplary embodiment. FIG. 17 illustrates an overall configuration of the projection apparatus 170 according to the tenth exemplary embodiment. The projection apparatus 170 according to the present exemplary embodiment is a liquid crystal projector using a lamp and a diaphragm mechanism.

The projection apparatus 170 includes a lamp 101 as a light source, a light concentration correction optical system 12, a liquid crystal panel 13 as a spatial modulation element, a light guiding lens 171, a diaphragm mechanism 172, and a projection lens 14. The diaphragm mechanism 172 may be a diaphragm using a mechanical rotation mechanism, an electromagnetic diaphragm, or an optical diaphragm using a liquid crystal. The timing controller 23 opens and closes the diaphragm mechanism 172 according to the display timing. The interior portion of the projection apparatus 170 is configured by replacing the LED 26 of the projection apparatus 10 illustrated in FIG. 2 with the lamp 101.

Figure 18:
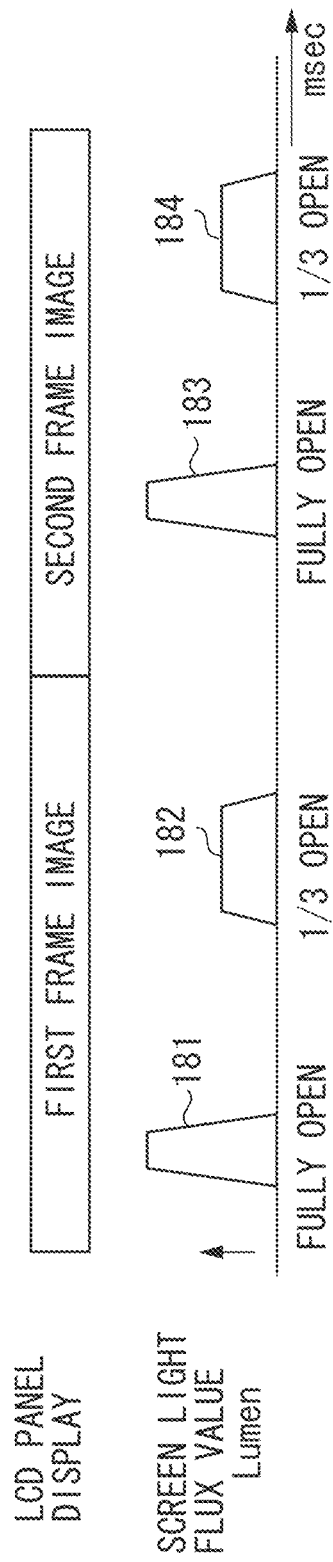
FIG. 18 illustrates a light-emission state according to the tenth exemplary embodiment.

FIG. 18 illustrates a light-emission state of the projection apparatus 170 according to the tenth exemplary embodiment. Referring to FIG. 18, the horizontal axis is assigned the elapsed time, and the vertical axis is assigned the screen light flux value. FIG. 18 illustrates a bright short light flux 181 of the original image in one frame, a dark long light flux 182 of the original image in the first frame, a bright short light flux 183 of the original image in the second frame, and a dark long light flux 184 of the original image in the second frame. The timing controller 23 fully opens the diaphragm mechanism 172 for the light fluxes 181 and 183, opens by one third the diaphragm mechanism 172 for the light fluxes 182 and 184, and fully closes the diaphragm mechanism 172 for other light fluxes.

It is difficult to control light quantity of the lamp 101 in a short time as with the LED 11. Therefore, the projection apparatus 170 according to the present exemplary embodiment achieves a short bright light-emission state and a long dark light-emission state by using the diaphragm mechanism 172. Specifically, the timing controller 23 controls opening and closing of the diaphragm mechanism 172 in a time period during which the image in one frame is displayed according to the tendency of flicker occurrence, thus controlling the number of light emissions and the light-emission duration of the lamp 101. Thus, the image display as illustrated in FIG. 8E is obtained.

The lamp 101 provides a larger light quantity than the LED 11. Therefore, even if a reduced light quantity due to the diaphragm mechanism 172 is taken into consideration, the projection apparatus using the lamp 101 is able to provide brighter projection than the projection apparatus using the LED 11.

The following describes image display achieved by using an intermediate image, according to an eleventh exemplary embodiment. The present exemplary embodiment uses the projection apparatus 170 according to the tenth exemplary embodiment.

Figure 19:
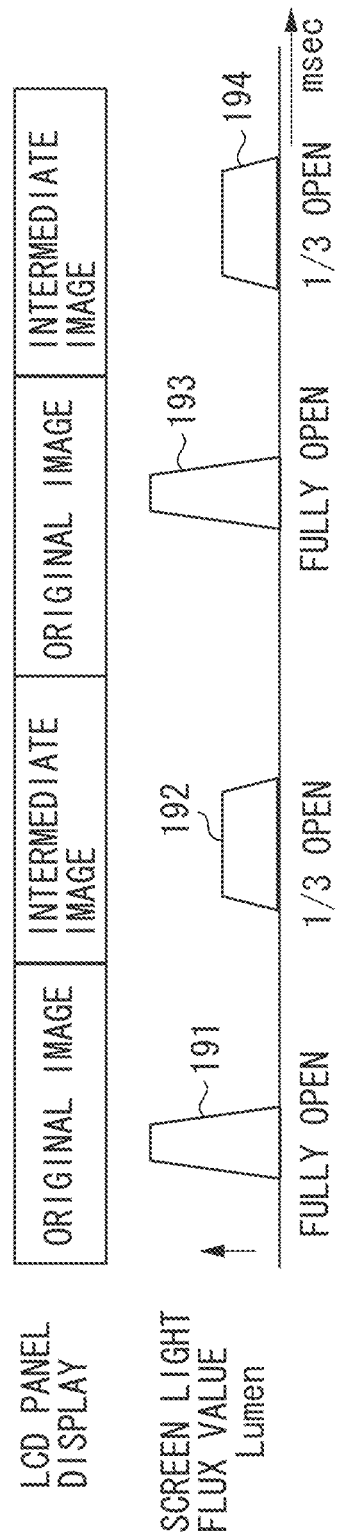
FIG. 19 illustrates a light-emission state according to an eleventh exemplary embodiment.

FIG. 19 illustrates a light-emission state of the projection apparatus 170 according to the eleventh exemplary embodiment. Referring to FIG. 19, the horizontal axis is assigned the elapsed time, and the vertical axis is assigned the screen light flux value. FIG. 19 illustrates a bright short light flux 191 of the original image in the first frame, a dark long light flux 192 of the intermediate image in the first frame, a bright short light flux 193 of the original image in the second frame, and a dark long light flux 194 of the intermediate image in the second frame. The timing controller 23 fully opens the diaphragm mechanism 172 for the light fluxes 191 and 193, opens by one third the diaphragm mechanism 172 for the light fluxes 192 and 194, and fully closes the diaphragm mechanism 172 for other light fluxes.

Since the eleventh exemplary embodiment uses an intermediate image, it can display an image having less moving image blur than the tenth exemplary embodiment.

The following describes emission states according to a twelfth exemplary embodiment. The present exemplary embodiment uses the projection apparatus 170 according to the tenth exemplary embodiment.

Figure 20:
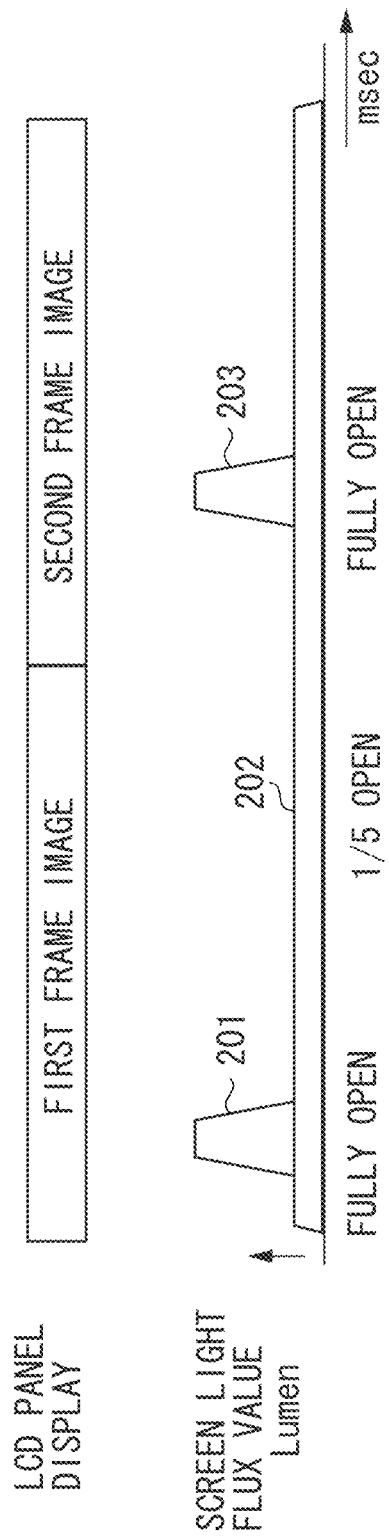
FIG. 20 illustrates a light-emission state according to a twelfth exemplary embodiment.

FIG. 20 illustrates a light-emission state of the projection apparatus 170 in the twelfth exemplary embodiment. Referring to FIG. 20, the horizontal axis is assigned the elapsed time, and the vertical axis is assigned the screen light flux value. FIG. 20 illustrates a bright short light flux 201 of the original image in the first frame, a light flux 202 produced by a constant-level light emission, and a bright short light flux 203 of the original image in the second frame. The timing controller 23 fully opens the diaphragm mechanism 172 for the light flux 201, and opens by one fifth the diaphragm mechanism 172 for the light flux 202.

The timing controller 23 opens by one fifth the diaphragm mechanism 172 over the entire display time, and fully opens the diaphragm mechanism 172 for a short duration in the first half of one frame.

The projection apparatus 170 according to the twelfth exemplary embodiment achieves a short bright light-emission state and a very long dark light-emission state by using the lamp 101 and the diaphragm mechanism 172. Therefore, the present exemplary embodiment achieves similar emission states and similar effects to those in the seventh exemplary embodiment, without using the LED 11.

The following describes a thirteenth to a fifteenth exemplary embodiments in which a digital mirror device (hereinafter referred to as a DMD element) is used as a spatial modulation element. With a conventional projection apparatus using only one DMD element, a rotary wheel is divided into a plurality of color fields to project respective colors by changing the color fields. In projection with respective color fields, only the RGB (R:Red, G:Green, B:Blue) light components are extracted by using the rotary wheel, and the light modulation according to the light components is performed to reproduce an image. For example, the RGB components are changed at 5-ms intervals in a 60-Hz frame duration (16 ms). To display an image as brightly as possible, for example, a certain projection apparatus adds the W light component to the RGB light components, such as RGBW (W:White) in a 60-Hz time period, as discussed in Japanese Patent Application Laid-Open No. 2011-95402.

Further, to provide gradations in respective color fields, a certain projection apparatus performs image projection by using sub fields. When image is displayed by using sub fields, a plurality of sub fields corresponding to long and short display durations is provided in respective color fields. Long and short sub frames are switched by using a binary spatial modulation element for performing ON/OFF operations to display an image having gradations.

If the RGB components are switched at 5-ms intervals in a 60-Hz frame duration (16 ms), as described above, to display an image for respective color fields at 60 Hz, a disturbance called a color breaking phenomenon occurs. Specifically, when a moving object is displayed, colored (red or green) tailing appears from the object, possibly making it very hard for the viewer to watch. Even if the W (white) light component is added to the RGB light components as with Japanese Patent Application Laid-Open No. 2011-95402, the RGB display time in RGBW light emissions changes from 5 ms to 4 ms for each color and therefore the color breaking phenomenon occurs.

If a light emission is performed for each of the RGB colors in a short time period, for example, within a half of the 60-Hz period or less, the light-emission duration for each color becomes as short as about 2 ms. Thus, the color breaking phenomenon becomes obscure. However, a short light emission of each of the RGB colors is close to an impulsive light emission. This phenomenon is called flicker, and causes a viewer to feel disturbance.

There has been proposed a projection apparatus which performs two light emissions for each color, for example RGBRGB, in a 60-Hz time period by quickly changing the display color. Japanese Patent Application Laid-Open No. 2010-169723 discusses a projection apparatus which performs light emissions of six different colors, for example RGBYMC (Y:Yellow, M:Magenta, C:Cyan), in a 60-Hz time period. The above-described methods enable reducing the color breaking phenomenon and the flicker phenomenon. However, applying these methods causes the viewer to feel disturbance due to a double image of a moving object.

For example, when displaying the orange color, R and G light emissions are performed and, after a certain time period, Y and M light emissions are performed. Therefore, an orange double line due to the R and G light emissions and the Y and M light emissions will be produced. To prevent this phenomenon, a method for generating an intermediate image from the original image, and performing RGB display at 120 Hz may be applied. This method, however, requires a large-scale circuit to generate an intermediate image. Further, a disordered image portion due to an intermediate image generation error may appear as a disturbance. Therefore, there has been proposed a projection apparatus which performs only a W light emission at a high frequency out of RGBW light emissions to prevent flicker while brightly displaying an image, as discussed in Japanese Patent Application Laid-Open No. 2007-264427.

With the method discussed in Japanese Patent Application Laid-Open No. 2007-264427, however, a DMD element displays an image by using sub fields to provide gradations and therefore performing a W light emission at a high frequency will cause ON/OFF operations in sub fields. In this case, gradations cannot be correctly displayed. Thus, the method for displaying gradations by using sub fields of the DMD element as a spatial modulation element may also cause a problem that gradations cannot be correctly displayed.

The present exemplary embodiments enable preventing the occurrence of color breaking and flicker in image display using the DMD element.

Figure 21:
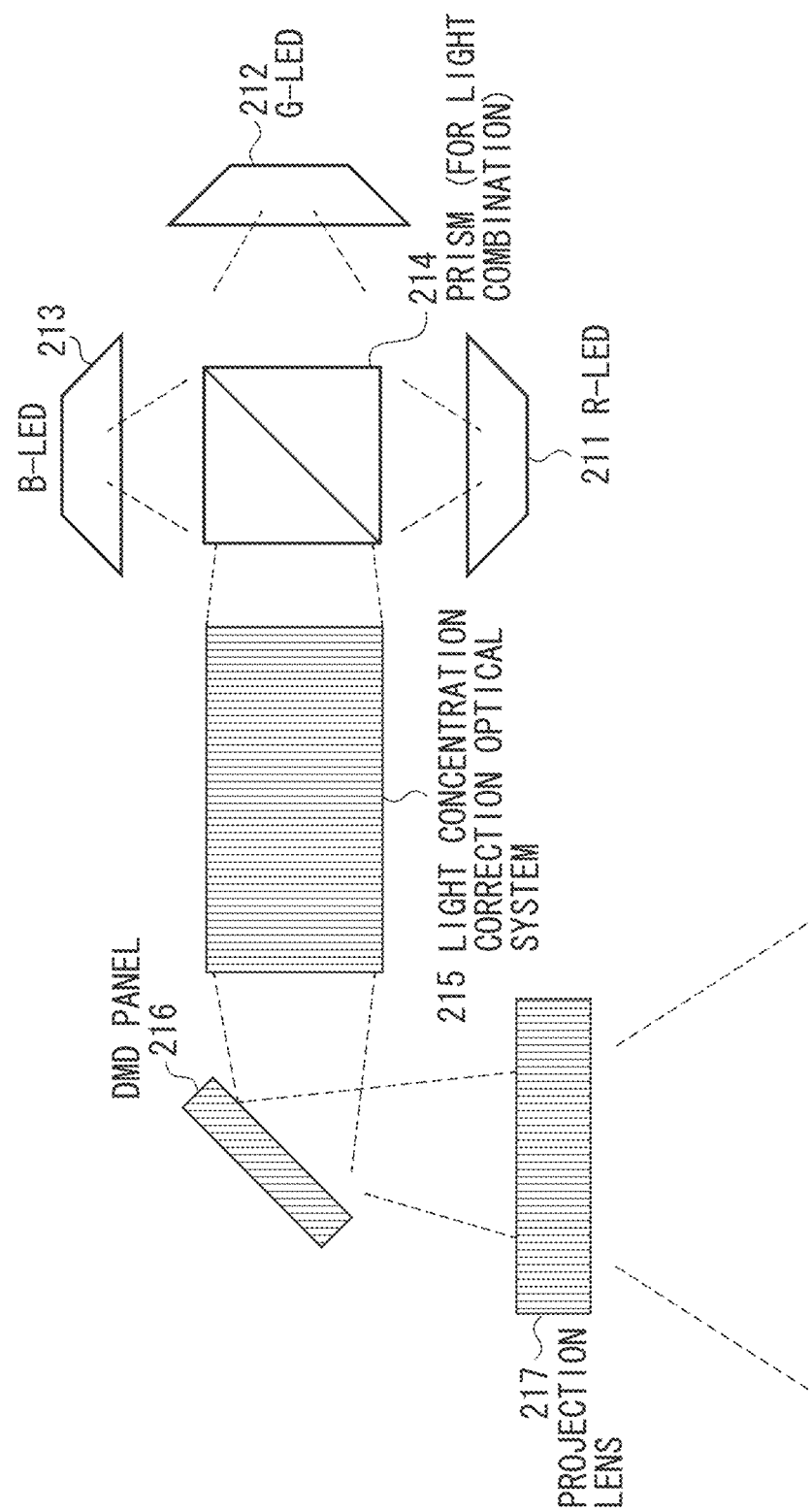
FIG. 21 illustrates an overall configuration of a projection apparatus according to a thirteenth to a fifteenth exemplary embodiments.

The following describes a configuration of a projection apparatus according to the present exemplary embodiments. FIG. 21 illustrates an overall configuration of the projection apparatus using 3-color LEDs as light sources, and the DMD element, according to a thirteenth to a fifteenth exemplary embodiments. Referring to FIG. 21, the projection apparatus according to the present exemplary embodiment includes a R-LED 211 as a red light source, a G-LED 212 as a green light source, a B-LED 213 as a blue light source, a light combination prism 214, a light concentration correction optical system 215, a DMD element 216 as a spatial modulation element, and a projection lens 217. Although the R-LED 211, the G-LED 212, and the B-LED 213 of respective colors as light sources are arranged in three different directions, light fluxes output by these LEDs are aligned in one direction by the light combination prism 214. The light aligned in one direction by the light combination prism 214 is condensed and converted into a parallel beam by the light concentration correction optical system 215. The parallel beam converted by the light concentration correction optical system 215 enters the spatial modulation element 216 (modulation element). Then, modulated light is output by the spatial modulation element 216 (modulation element). Then, the light is magnified and projected on a screen (not illustrated) by the projection lens 217.

Figure 22:
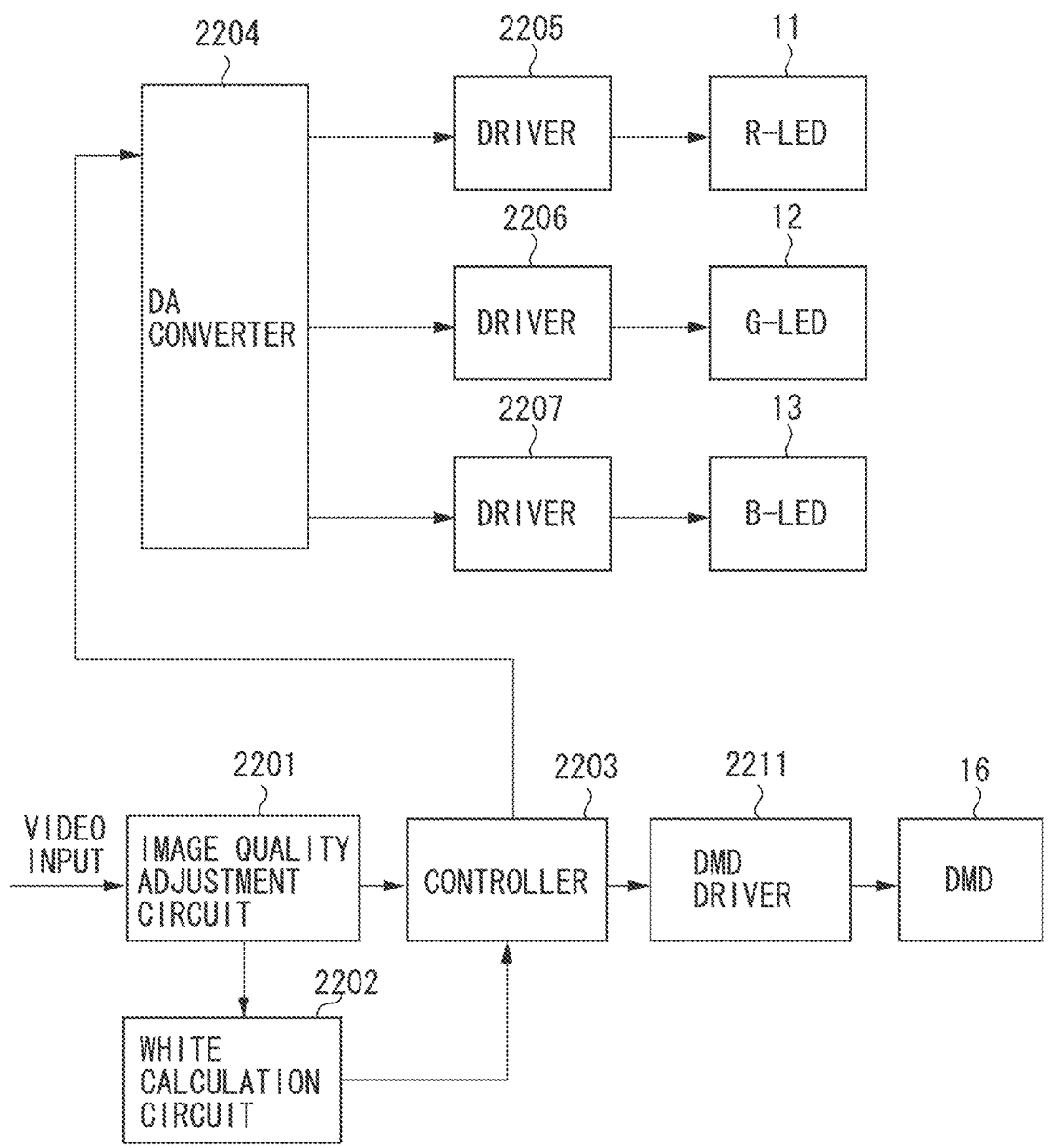
FIG. 22 illustrates a circuit configuration of a projection apparatus using light emitting diodes (LEDs) and a digital mirror device (DMD).

FIG. 22 illustrates a circuit configuration of the projection apparatus using three LEDs and a DMD element, according to the thirteenth exemplary embodiment. An image quality adjustment circuit 2201 adjusts the image quality of an input image according to the display unit and values set by the viewer. A white calculation circuit 2202 (operational circuit) calculates the white value. A controller (control circuit) 2203 controls the operation timing of the DMD element and the light-emission timing of the LED light sources.

Each of the LEDs has two different light-emission modes: a first light-emission mode in which the LED emits light having a first luminance for a first light-emission duration, and a second light-emission mode in which the LED emits light having a second luminance (darker than the first luminance) for a second light-emission duration (longer than the first light-emission duration). The controller 2203 controls light emissions of light emission units (the R-LED 211, the G-LED 212, and the B-LED 213) in one frame of the video signals, by combining the first light-emission mode and the second light-emission mode, and controls the operation of the spatial modulation element 216 corresponding to light emissions of the light emission units.

A DA converter 2204 converts control signals from the controller (control circuit) 2203, and inputs the converted control signals to the drivers 2205, 2206, and 2207 for driving respective color LEDs. The driver 2205 drives the R-LED 211 serving as a red light source, the driver 2206 drives the G-LED 212 serving as a green light source, and the driver 2207 drives the B-LED 213 serving as a blue light source. A DMD driver 2211 (modulation element driving unit) receives a control signal from the controller 2203, and controls the drive of the spatial modulation element 216 (DMD) based on the control signal received from the controller 2203.

The following describes the operation of the circuit configuration illustrated in FIG. 22. The image quality adjustment circuit 2201 performs image quality adjustment of the input video signals (YPbPr signals) by using the DMD panel characteristics and viewer's preferences as parameters, and outputs the RGB signals as an optimum image to the white calculation circuit 2202 and the controller 2203. The image quality adjustment circuit 2201 can also output to the white calculation circuit 2202 the input video signals (YPbPr signals) together with the RGB signals. The white calculation circuit 2202 calculates a gradation value to be output as white based on the ratio of the white component in the original image, and flicker relations.

The controller 2203 generates a timing signal for scanning at a predetermined timing, for example, at 60 Hz, and a sub field signal according to the gradation data based on the RGB signals, and outputs these signals to the DMD driver 2211. Then, based on the timing signal and the sub field signal input from the controller 2203, the DMD driver 2211 drives the spatial modulation element 216 to perform spatial modulation. Then, an image is displayed.

Figure 23A:
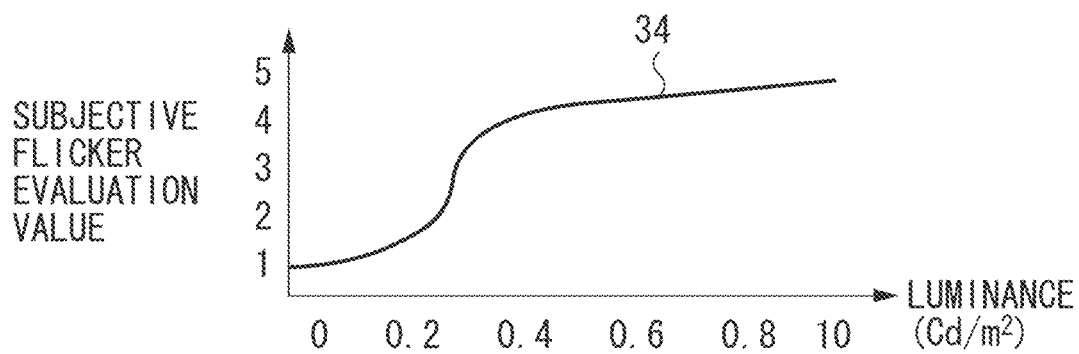
FIGS. 23A, 23B, and 23C illustrate an experiment on flicker evaluation.

The following describes operations for each of the LED light sources. The controller 2203 outputs to the DA converter 2204 a voltage value equivalent to the current setting value to be applied to the LEDs. For example, in applying a 20-mA current value for a LED light emission, the current setting value is 2V. In applying a 4-mA current value for a LED light emission, the current setting value is 0.4V. The controller 2203 performs control to apply the current setting value only while the LED light emission is required, and apply 0V at the end of the LED light-emission duration. The controller 2203 controls the voltage value output and the voltage value switching for each of the RGB LEDs. The above-described voltage value output control by the controller 2203 enables obtaining a desired emission state, as illustrated in FIG. 24C. We obtained the suitable ratio of light fluxes for emissions based on an evaluation experiment when performing two LED light emissions to prevent flicker. FIG. 23A illustrates a result of an experiment on a relation between the luminance ratio and the subjective flicker evaluation when two LED light emissions are performed for a display patch 233. FIG. 23A illustrates a relation between the luminance and the subjective flicker evaluation. The subjective flicker evaluation according to the present exemplary embodiment is similar to that according to the first exemplary embodiment.

Figure 23B:
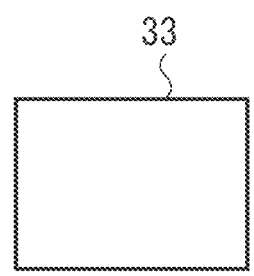
Figure 23C:
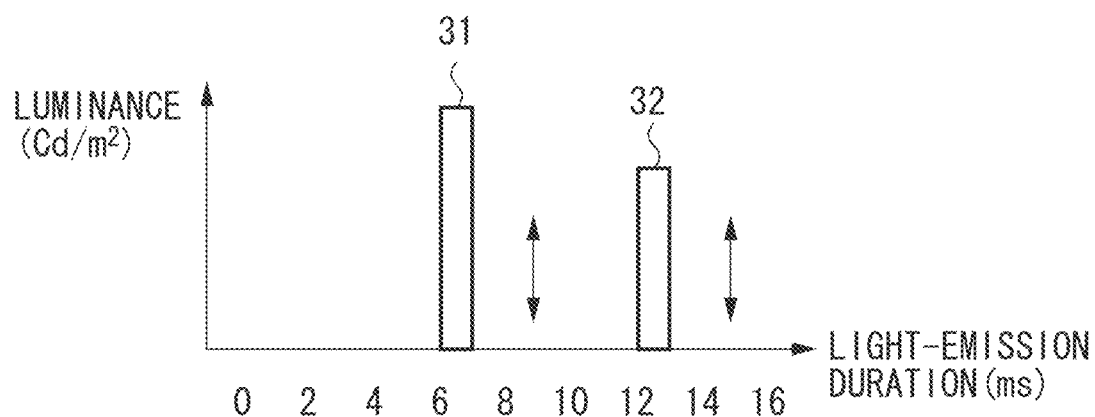

FIG. 23B illustrates an example of the display patch 233. Although the display patch 233 is a rectangle in the present exemplary embodiment, the shape of the display patch 233 according to the present invention is not limited to thereto, and may be other shapes. The display patch 233 has an area of 300 mm$^2$, and is entirely white. FIG. 23C illustrates an example of a relation between two LED light-emission durations and the luminance of respective light emissions. The controller 2203 controls the DMD driver 2211 to change the ratio of a luminance 231 of the first light emission and a luminance 232 of the second light emission while maintaining a constant total luminance value of the two LED light emissions (200 Cd/m$^2$). Although, in the example illustrated in FIG. 23C, the luminance of the second light emission is lower than the luminance of the first light emission, the relation between the two light emissions is not limited thereto. For example, control may be performed so that the luminance of the second light emission is higher than the luminance of the first light emission.

Based on the result of the subjective evaluation, we understood that the subjective evaluation value is 4 or more when the luminance ratio is 1.0:0.4 or more, and that flicker is permissible in this case. To facilitate subsequent calculations, 1.0:0.4 is normalized and replaced with 0.7:0.3. This value applies to a total luminance value of 200 Cd/m$^2$. Therefore, in a display state where an image is too bright and has a large amount of white component as a projector, the ratio of the first and the second LED light emissions is desirably set to 0.7:0.3. Since the screen luminance value is proportional to the screen light flux value, we understood that the light flux value of the second light emission is 30% of the total light flux value of the two light emissions, as a rough standard value.

FIGS. 25A and 25B illustrate an example of a LED emission state according to the thirteenth exemplary embodiment of the present invention. In the first light-emission mode, the controller 2203 controls the light emission units (the R-LED 211, the G-LED 212, and the B-LED 213) to sequentially perform single light emission for each of the plurality of colors. In the second light-emission mode, the controller 2203 controls the light emission units to simultaneously emit light.

Referring to FIG. 25B, the horizontal axis is assigned the elapsed time, and the vertical axis is assigned the screen light flux value. FIG. 25A illustrates an example of the display order of the R image, the G image, the B image, and the common image (W image) in each frame corresponding to the elapsed time illustrated in FIG. 25B. FIG. 25B illustrates a red light flux 211 in the first frame, a green light flux 222 in the first frame, a blue light flux 223 in the first frame, a white light flux 224 in the first frame, a red light flux 225 in the second frame, a green light flux 226 in the second frame, a blue light flux 227 in the second frame, and a white light flux 228 in the second frame. The light fluxes emitted by the R-LED 211, the G-LED 212, and the B-LED 213 of respective colors are slightly decreased by the light combination prism 214 and the light concentration correction optical system 215, decreased by the average image level (APL) of image display by the spatial modulation element 216, and slightly decreased by the projection lens 217. Then, an output light flux is obtained.

A short bright red light flux, such as the light fluxes 221 and 225, can be obtained by applying via the driver 2205 a large current, for example, 400 mA, to the R-LED 211 for a short time period, for example, 2 ms. Similar to the red light flux, a green light flux, such as the light fluxes 222 and 226, can be obtained by applying via the driver 2206 a large current, for example, 400 mA, to the G-LED 212 for 2 ms. Likewise, a blue light flux, such as the light fluxes 223 and 227, can be obtained by applying via the driver 2207 a large current, for example, 400 mA, to the B-LED 213 for 2 ms.

A dark long white light flux can be obtained by simultaneously applying via the three drivers 2205, 2206, and 2207 a low current, for example, 40 mA, respectively to the R-LED 211, the G-LED 212, and the B-LED 213 for a long time period, for example 8 ms. It is necessary to change the ratio of the current to be applied to the respective LEDs based on the light conversion efficiency thereof. To simplify descriptions, white is obtained by applying the same current to each of the three (RGB) LEDs. For example, in a 60-Hz (16.7 ms) image frame, the controller 2203 controls each of the RGB LEDs to emit bright short light by applying a large current, for example 400 mA, to each of the RGB LEDs for a short time period, for example, 2 ms (first light-emission mode). Further, the controller 2203 controls the RGB LEDs to simultaneously emit light so that, in this image frame, the luminance is darker and the light-emission duration is longer than those in a light emission of each of the RGB LEDs (second light-emission mode).

Since the amount of light flux is proportional to the current value multiplied by the duty time, the amount of light flux of the short bright light emission is 400×2/16.7=48 for each of the three colors, and the amount of white light flux is 40×8/16.7=19. Therefore, the ratio of the light flux values in this case is 0.72:0.28. Based on the result of the subjective evaluation illustrated in FIG. 23A, the ratio 0.72:0.28 has no problem since it is close to a rough standard value of the tolerance (0.7:0.3).

For example, image data having RGB gradation values (R=30, G=80, B=120) is based on 256 linear gradations. To obtain a white gradation value, the least gradation value (R=30) is noticed. When this value is allocated based on the ratio 0.72:0.28 of the light flux values, a red gradation value (R=30×0.72=22) and a white gradation value (W=30× 0.28=8) will be displayed.

A blue gradation value (B=80−8=72), and a green gradation value (G=120−8=112) will be displayed. When achieving 256 gradations by using sub fields, the spatial modulation element 16 desirably outputs the RGB gradation values (R=22, G=72, B=112) in 2 ms of the short bright RGB light fluxes 221, 222, and 223.

Since the light-emission duration of the dark long W (white) light flux 224 is 8 ms, the duty ratio of the light flux 224 is 4 times that for each of the RGB light fluxes. When a gradation value to be output is 30×0.28=8, desirably, each of the RGB LEDs simultaneously outputs RGB gradation values (R=2, G=2, B=2).

The following supplementary describes a method for displaying gradations by using sub fields. To provide 256 gradations in each of RGBW color fields, 8 sub fields will be used. A sub field 1 is one 256th of the light-emission duration, a sub field 2 is one 128th of the light-emission duration, . . . , a sub field 7 is a quarter of the light-emission duration, and a sub field 8 is a half of the light-emission duration. Therefore, when the light-emission duration for each of RGB (2 ms) is distributed to each sub field, the sub field 1 is 7.8 µs, the sub field 2 is 15.6 µs, . . . , the sub field 7 is 500 µs, and the sub field 8 is 1 ms.

Since the light-emission duration of W (8 ms) is distributed to each sub field, the sub field 1 is 31.25 µs, the sub field 2 is 62.5 µs, . . . , the sub field 7 is 2 ms, and the sub field 8 is 4 ms. For example, a gradation value (R=22) is represented by a binary number 00010110 (0x27 (sub field 8)+0x26 (sub field 7)+0x25 (sub field 6)+1x24 (sub field 5)+0x23 (sub field 4)+1x22 (sub field 3))+1x21 (sub field 2)+0x20 (sub field 1)). Therefore, to output the gradation value (R=22), the mirror of the DMD is desirably driven (ON) in the sub fields 2, 3, and 5. To output a white gradation value (W=2) (binary number 00000010), the mirror of the DMD is desirably driven (ON) in the sub field 2. Although a simple example has specifically been described above, a disturbance called image crack may arise when 8 sub fields are used. Therefore, an improved method can also be used, for example, by equally dividing the longest sub field (the sub field 8) into two, and arranging long sub fields separately with each other in terms of time by using the 9 sub fields.

When the R-LED 211, the G-LED 212, and the B-LED 213 are controlled to perform single bright short RGB light emissions and a W light emission (simultaneous RGB light emissions) which is darker and longer than single light emissions within one frame, as illustrated in FIG. 25B. Thus, favorable image display, as illustrated in FIG. 24C, can be obtained. This image display is natural as a view of a movement of an object on a display apparatus, and permissible by the viewer.

FIGS. 24A, 24B, and 24C comparatively illustrate image views according to the thirteenth exemplary embodiment and conventional image views. FIG. 24A illustrates an image view by two (bright and dark) hold light emissions having different luminance levels (conventional case). FIG. 24B illustrates an image view by two impulsive light emissions (conventional case). FIG. 24C illustrates an image view by a light emission according to the present exemplary embodiment. Referring to each of FIGS. 24A, 24B, and 24C, a displayed spherical object is moving from right to left for each frame. The vertical axis is assigned time. In the case of an image having a 60-Hz frame frequency, the image changes at intervals of 16.67 ms. The arrow head indicates the movement of the line-of-sight.

FIG. 24A illustrates hold light emissions of the LEDs. An object image 2115 appears in a first light-emission duration by a bright hold-type light emission. An object image 2116 appears in a second light-emission duration by a dark hold-type light emission. An object image 2117 appears as a combination of the object images 2115 and 2116 along the movement of the line-of-sight. The viewer watches the object image 2117 as a bright ellipse and a dark ellipse which looks like tailing.

FIG. 24B illustrates impulsive light emissions of the LEDs so that the image looks like a sphere. An object image 2118 is a sphere image appearing within one frame by the first impulsive light emission. An object image 2119 is a sphere image appearing within one frame by the second impulsive light emission. An object image 2120 is a sphere image appearing in combined several frames by impulsive light emissions. Referring to FIG. 24B, the object image 2118 is an image appearing by the first impulsive light emission. Since this light emission is an impulsive light emission, the image looks like a sphere. Although the object image 2119 is also a sphere image appearing by the second impulsive light emission, the object image 2119 is displayed with a time delay and therefore deviates from the movement of the line-of-sight. The shape appearing as a combination of the object images 2118 and 2119 along the movement of the line-of-sight looks like a double image, as illustrated by the object image 2120. This phenomenon is called a double blur which is not desirable from the viewpoint of image quality.

FIG. 24C illustrates an image view according to the present exemplary embodiment. An object image 2121 is a sphere image appearing within one frame by an impulsive bright light emission. An object image 2122 is a sphere image appearing within one frame by a dark hold-type light emission. An object image 2123 is a sphere image appearing in combined several frames by light emissions according to the present exemplary embodiment. Referring to FIG. 24C, the object image 2121 is an image appearing by the first bright impulsive light emission. Since this light emission is an impulsive light emission, the image looks like a sphere. The object image 2122 is an image appearing in the second dark hold-type light emission. The image looks like a dark ellipse. The object image 2123 is an image appearing as a combination of the object images 2121 and 2122 along the movement of the line-of-sight.

The shape of the object image 2123 looks like a bright sphere and a trailing dark ellipse. More specifically, the viewer watches a bright shape which is the same as the moving shape, and a trailing dark image, such as tailing. The object image 2123 appears neither as a changed shape like the object image 2117 nor as a double image like the object image 2120. Although dark tailing appears with the object image 2123, this image display is natural as a view of a movement of an object, and permissible by the viewer. The image display as illustrated in FIG. 24C is possible not only in the present exemplary embodiment but also in a fourteenth to a seventeenth exemplary embodiments (described below).

The following describes a fourteenth exemplary embodiment focusing on a relation between an image and a LED light emission in a case where a monochromatic intermediate image is generated from a 60-Hz original image, and the intermediate image is displayed at 120 Hz. FIGS. 26A and 26B illustrate an example of a LED emission state according to the fourteenth exemplary embodiment. The circuit configuration of a projection apparatus using LEDs and a DMD element according to the present exemplary embodiment is similar to that according to the first exemplary embodiment. The controller 203 controls the light modulation of the spatial modulation element 216 so that the original color image according to the video signals and the monochromatic intermediate image are alternately displayed.

Referring to FIG. 26B, the horizontal axis is assigned the elapsed time, and the vertical axis is assigned the screen light flux value. FIG. 26A illustrates an example of the display order of the R image, the G image, the B image, and an intermediate common image in each frame corresponding to the elapsed time illustrated in FIG. 26B. FIG. 26B illustrates a red light flux 231 for the original image in the first frame, a green light flux 232 for the original image in the first frame, a blue light flux 233 for the original image in the first frame, and a white light flux 234 for the intermediate image between the first and the second frames. FIG. 26B illustrates further illustrates a red light flux 235 for the original image in the second frame, a green light flux 236 for the original image in the second frame, a blue light flux 237 for the original image in the second frame, and a white light flux 238 for the intermediate image in the second frame and the third frame.

In the fourteenth exemplary embodiment, RGB gradation values and a W gradation value to be displayed are calculated independently for each of the original image and the intermediate image. RGB gradation values calculated based on the original image are applied to bright short RGB light emissions, and a W gradation value calculated based on the intermediate image is applied to a dark long W light emission. Using these calculated values enable obtaining a more favorable moving image without tailing. Since a light flux produced by a W light emission is restrained to about 40% or less of the total amount of light fluxes produced by single RGB light emissions, the viewer does not easily feel the disturbance due to an intermediate image generation error.

FIGS. 27A and 27B illustrate an example of a LED emission state according to the fifteenth exemplary embodiment. The circuit configuration of a projection apparatus using LEDs and a DMD element according to the present exemplary embodiment is similar to that according to the first exemplary embodiment.

The controller 2203 controls the light emission units (the R-LED 211, the G-LED 212, and the B-LED 213) to sequentially perform single light emission for each of the plurality of colors in the first light-emission mode. In the second light-emission mode following the first light-emission mode, the controller 2203 controls the LEDs of the light emission units to sequentially perform single light emission for each of the plurality of colors in the same order as that in the first light-emission mode. Referring to FIG. 27B, the horizontal axis is assigned the elapsed time, and the vertical axis is assigned the screen light flux value. FIG. 27A illustrates an example of the display order of the R image, the G image, and the B image in each frame corresponding to the elapsed time illustrated in FIG. 27B. FIG. 27B illustrates a red light flux 241 for the original image in the first frame, a green light flux 242 for the original image in the first frame, and a blue light flux 243 for the original image in the first frame. FIG. 27B further illustrates a red light flux 244 for the intermediate image between the first and the second frames, a green light flux 245 for the intermediate image between the first and the second frames, and a blue light flux 246 for the intermediate image between the first and the second frames.

FIG. 27B further illustrates a red light flux 247 for the original image in the second frame, a green light flux 248 for the original image in the second frame, and a blue light flux 249 for the original image in the second frame. FIG. 27B further illustrates a red light flux 2401 for the intermediate image between the second and the third frames, a green light flux 2402 for the intermediate image between the second and the third frames, and a blue light flux 2403 for the intermediate image between the second and the third frames.

The following is a description using specific numbers. RGB light emission durations (single light emission durations) for the original image are desirably as short as possible to obtain a sharp image. However, since a duration is required to a certain extent to configure sub fields, the RGB light-emission durations are set to 2 ms. RGB light emission durations for the intermediate image should be as long as possible to obscure the feeling of disturbance due to a conversion error. Therefore, the longest possible duration is allocated out of the remaining time of one-frame, i.e., 16.67 ms (at 60 Hz). For example, 3 ms is set for each color.

The following describes the calculation of RGB gradation values to be displayed for the intermediate image. Image data having RGB gradation values (R=30, G=80, B=120) is assumed based on 256 linear gradations. The above-described RGB gradation values (R=30, G=80, B=120) may be used as they are for RGB gradation values for each pixel of the original image.

Based on the result of the subjective evaluation, as for the intermediate image, the subjective evaluation value is 4 or more when the luminance ratio is 1.0:0.4 or more, and flicker is permissible in this case. Therefore, this ratio is used for the intermediate image. Since the duty ratio of light-emission durations of 2 ms and 3 ms is 1.5, the gradation number should be 0.4/1.5=0.267 times RGB gradation values. Specifically, RGB gradation values for the intermediate image are calculated as follows: a red gradation value (R=30×0.267=8), a green gradation value (G=80× 0.267=21), and a blue gradation value (B=120×0.267=32).

In the present exemplary embodiment in which an intermediate image is used, a favorable image without tailing as with the first exemplary embodiment can be obtained when a moving image is displayed. In this case, RGB light emissions are performed for the intermediate image without calculating a W (white) gradation value as with the fourteenth exemplary embodiment. Since the light flux produced by RGB light emissions for the intermediate image is restrained to about 40% or less of the total amount of light fluxes produced by RGB light emissions, the viewer hardly feels the disturbance due to an intermediate image generation error.

Although in the thirteenth to the fifteenth exemplary embodiments, a single-panel DMD element is used as an example, the configuration is not limited thereto. Even when spatial modulation elements, such as three DMD elements, are used for each of RGB colors, similar effects can be obtained by controlling the light sources in a similar way.

Figure 28:
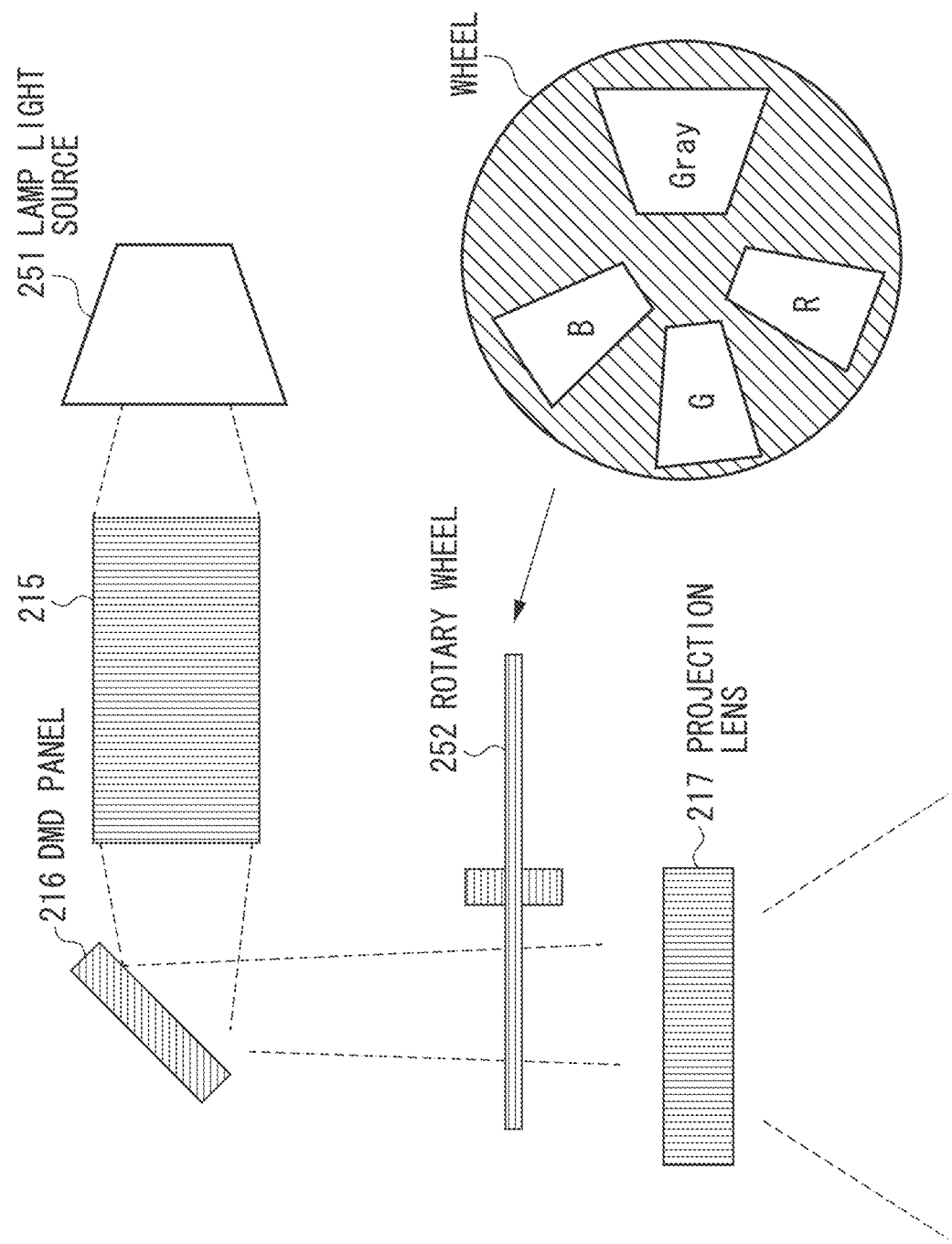
FIG. 28 illustrates an overall configuration of an projection apparatus according to sixteenth and seventeenth exemplary embodiments.

Projection apparatuses using LED light sources according to the thirteenth to the fifteenth exemplary embodiments have specifically been described above. The following describes a projection apparatus using a lamp light source according to a sixteenth exemplary embodiments. When a lamp is used as a light source, it becomes difficult to change the light quantity of the lamp in a short time. The following describes a configuration using a rotary wheel 252 instead of using the LED light sources. FIG. 28 illustrates an overall configuration of the projection apparatus according to the present exemplary embodiment, i.e., a liquid crystal projector using a lamp light source and a rotary wheel. Referring to FIG. 28, the projection apparatus includes a lamp 251 as a light source (lamp light source), a light concentration correction optical system 215, a spatial modulation element 216, such as a DMD element, a rotary wheel 252, and a projection lens 217. The rotary wheel 252 (adjustment unit) selects any one of optical filters for a plurality of colors and a halftone optical filter to allow light (modulated by the spatial modulation element 216) to pass through the selected optical filter, thus adjusting the color, the luminance, and the light-transmission duration.

When viewed from the front side (the side of the spatial modulation element 16), the rotary wheel 252 is provided in a repetitive fashion with monochromatic RGB optical filters having a narrow slit spacing, and a half-gray (Gray:Half tone) optical ND filter having a wide slit spacing. The controller 2203 rotates the rotary wheel 252 in synchronization with the display timing. Although one rotation of the rotary wheel 252 illustrated in FIG. 28 corresponds to display of one period, the filter configuration is not limited thereto. For example, the filter can be configured such that one rotation of the rotary wheel 252 corresponds to display of two or more periods. This is advantageous since display control can be performed with a reduced number of rotations of the rotary wheel 252.

The lamp 251 as a light source emits light which forwardly diffuses. The light emitted from the lamp light source 251 is condensed and converted into a parallel beam by the light concentration correction optical system 215. The parallel beam converted by the light concentration correction optical system 215 enters the spatial modulation element 216. Then, light modulated according to the image displayed on the spatial modulation element 216 is output therefrom. Only light which has passed the monochromatic RGB slits and the half-gray slit of the rotary wheel 252 advances toward the projection lens 217. Then, the light is magnified and projected on a screen (not illustrated) by the projection lens 17.

In the sixteenth exemplary embodiment, it is difficult to perform on the lamp light source 251 light quantity control in a short time as achieved with the LED light source. Therefore, the rotary wheel 252 is rotated to generate a short bright light-emission state and a long dark light-emission state. The controller 2203 (control circuit) described with reference to FIG. 22 controls the rotation of the rotary wheel 252. The present exemplary embodiment is provided with two different light-transmission modes, a first light-transmission mode and a second light-transmission mode, in which light passes through the optical filters of the rotary wheel 252. In the first light-transmission mode, light having a first luminance passes through each of optical filters for different colors (RGB) in a first light-transmission duration. In the second light-transmission mode, light having a second luminance (darker than the first luminance) passes through the halftone optical filter (Gray) in a second light-transmission duration (longer than the first light-transmission duration). The controller 2203 controls the rotation (switching) of the rotary wheel 252 (adjustment unit) so that light transmission in the first and the second light-transmission modes is performed in one frame of the video signals.

Rotation control of the rotary wheel 252 by the controller 2203 (control circuit) enables switching, in a short time, between the short bright light-emission state and the long dark light-emission state of the light from the lamp light source 251. Generally, the lamp light source 251 provides a larger light quantity than a LED light source. Therefore, even if a light quantity is reduced due to the rotary wheel 252, the projection apparatus using the lamp 251 is able to provide brighter projection than a projection apparatus using a LED light source.

FIGS. 29A and 29B illustrate an example of a light-emission state of the projection apparatus according to the sixteenth exemplary embodiment. Referring to FIG. 29B, the horizontal axis is assigned the elapsed time, and the vertical axis is assigned the screen light flux value. FIG. 29A illustrates an example of the display order of the R image, the G image, and the B image in each frame corresponding to the elapsed time illustrated in FIG. 29B. FIG. 29B illustrates a bright short red light flux 261 in the first frame, a bright short green light flux 262 in one frame, a bright short blue light flux 263 in the first frame, and a dark long white light flux 264 in the first frame. FIG. 29B further illustrates a bright short red light flux 265 in the second frame, a bright short green light flux 266 in the second frame, a bright short blue light flux 267 in the second frame, a dark long white light flux 268 in the second frame.

Each of the light fluxes illustrated in FIG. 29B can be produced by the spatial modulation element 216 and the rotary wheel 252. The RGB filters of the rotary wheel 252 having a narrow slit spacing correspond to short bright RGB light fluxes. As for the RGB filters, the spatial modulation element 216 is operated with the following gradation values. The Gray filter of the rotary wheel 252 having a wide slit spacing corresponds to a dark long white light flux. As for the Gray filter, the spatial modulation element 216 is operated with the following gradation values. The following is a description using specific values. To simplify descriptions, the transmissivity of the filters of the rotary wheel 252 is assumed to be as follows, as ideal conditions.
R filter: R=1.0, G=0, B=0
G filter: R=0, G=1.0, B=0
B filter: R=0, G=0, B=1.0
Gray filter: R=0.15, G=0.15, B=0.15
Slit spacing of the rotary wheel 252 for one period is shown below.
R filter: 0.1
G filter: 0.1
B filter: 0.1
Gray filter: 0.3
Remaining 0.5 corresponds to the spoke of the rotary wheel 52 which does not transmit light. The rotary wheel 252 configured in this way easily produces bright short RGB light emissions and a dark long W light emission. Since the ratio of gradation values is proportional to the transmissivity multiplied by the slit spacing, the ratio of monochromes and white (monochromes:white) is 1.0×0.1:0.15×0.3, and normalized to 0.69:0.31. This ratio is almost the same as a rough standard value of the tolerance of the subjective evaluation value (0.7:0.3), as illustrated in FIG. 23.

For example, a case of image data having RGB gradation values (R=30, G=80, B=120) is assumed based on 256 linear gradations. To obtain a white gradation value, the least gradation value R is targeted (R=30). When this value is allocated with the ratio 0.69:0.31 of the light flux values, a red gradation value (R=30×0.69=21), and a white gradation value (W=30×0.31=9) are displayed.

A blue gradation value (B=80−9=71), and a green gradation value (G=120−9=111) will be displayed. Since the transmissivity of each color filter is 1.0, the above-described gradation values are used as they are. Therefore, the spatial modulation element 216 should output RGB gradation values (R=21, G=71, B=111) in this order.

With respect to the dark long white light flux 264, the transmissivity is 0.1 times that of monochromatic light fluxes, and the light-emission duration is 4 times that of monochromatic light fluxes. Therefore, to provide the gradation number 9, the spatial modulation element 216 should output the RGB gradation values (R=21, G=71, B=111), and a W gradation value (W=9/0.4=23) in this order. Also in the present exemplary embodiment, image display as illustrated in FIG. 24C is obtained.

The following describes a seventeenth exemplary embodiment focusing on a relation between an image and a rotary wheel in a case where an intermediate image is generated based on a 60-Hz original image, and displayed at 120 Hz. FIG. 30 illustrates an example of a light-emission state of a projection apparatus according to the seventeenth exemplary embodiment. The circuit configuration of the projection apparatus using a DMD element, according to the present exemplary embodiment, is similar to that according to the sixteenth exemplary embodiment.

Referring to FIG. 30B, the horizontal axis is assigned the elapsed time, and the vertical axis is assigned the screen light flux value. FIG. 30A illustrates an example of the display order of the R image, the G image, the B image, and an intermediate common image in each frame corresponding to the elapsed time illustrated in FIG. 30B. FIG. 30B illustrates a short bright red light flux 271 for the original image in the first frame, and a short bright green light flux 272 for the original image in the first frame. FIG. 30B further illustrates a short bright blue light flux 273 for the original image in the first frame, and a long dark white light flux 274 for an intermediate image between the first and the second frames. FIG. 30B further illustrates a short bright red light flux 275 for the original image in the second frame, and a short bright green light flux 276 for the original image in the second frame. FIG. 30B further illustrates a short bright blue light flux 277 for the original image in the second frame, and a dark long white light flux 278 for an intermediate image between the second and the third frames.

In the seventeenth exemplary embodiment, RGB gradation values and a W gradation value to be displayed are calculated independently for each of the original image and the intermediate image. RGB gradation values calculated based on the original image are used for bright short RGB light emissions, and a W gradation value calculated based on the intermediate image is used for a dark long W light emission. Using these gradation values enables obtaining a more favorable moving image without tailing. Since a light flux produced by a W light emission is restrained to about 40% or less of the total amount of light fluxes produced by single RGB light emissions, the viewer hardly feels the disturbance due to an intermediate image generation error. Further, a white LED may be used instead of the above-described lamp light source according to the fourth and the fifth exemplary embodiments.

According to the above-described exemplary embodiments, gradations can be correctly displayed by using a DMD element while restraining the occurrence of color breaking and flicker.

Moreover, when a moving image having gradations is displayed with a projection apparatus using a single-panel DMD element, even if only an original image is used without an intermediate image, it is possible to obtain an image causing less disturbance feeling such as color breaking and a double image.

While the present invention has specifically been described based on the above-described exemplary embodiments, the present invention is not limited thereto but can be modified in diverse ways within the ambit of the appended claims.

The present exemplary embodiment is also realized by performing the following processing. Specifically, a program for realizing the functions of the above-described exemplary embodiments is supplied to a projection apparatus via a network or various types of storage media, and then a computer (or a CPU, a micro processing unit (MPU), etc.) of the projection apparatus reads the program and then executes it.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-229043 filed Oct. 16, 2012 and No. 2012-270700 filed Dec. 11, 2012, which are hereby incorporated by reference herein in their entirety.

What is claimed is:

1. A projection apparatus for displaying an image based on an input image signal by emitting light from a light source, the projection apparatus comprising:
    a detection unit configured to detect gradation information from the input image signal;
    a determination unit configured to determine a number of light emissions of the light source for displaying an image corresponding to one image frame based on the input image signal based on the gradation information detected from the input image signal by the detection unit such that a number of light emissions of the light source for displaying the image corresponding to one image frame based on the input image signal is larger in a case where the gradation information detected from the input image signal by the detection unit corresponds to higher brightness than a predetermined brightness in comparison with a case where the gradation information detected from the input image signal by the detection unit corresponds to lower brightness than the predetermined brightness; and
    a control unit configured to control the light source according to the determination of the number of light emissions of the light source based on the gradation information of the input image signal by the determination unit.

2. The projection apparatus according to claim 1, wherein, if the gradation information based on gradation values of the input image signal corresponds to the higher brightness than the predetermined brightness, the control unit controls the light source to perform two light emissions for displaying the image corresponding to one image frame based on the input image signal of one image frame, and controls the ratio of the first light-emission intensity and the second light-emission intensity based on the gradation information.

3. The projection apparatus according to claim 2, wherein the control unit performs control such that the second light-emission intensity is lower than the first light-emission intensity.

4. The projection apparatus according to claim 2, wherein the control unit performs control such that the second light-emission duration is longer than the first light-emission duration.

5. The projection apparatus according to claim 1, further comprising a generation unit configured to generate an intermediate image based on the input image signal,
    wherein, when the intermediate image is displayed after an original image corresponding to the input image signal of one image frame is displayed by a display unit, the control unit controls the light source to perform a first light emission in a time period during which the original image is displayed, and performs a second light emission in a time period during which the intermediate image is displayed.

6. The projection apparatus according to claim 1, wherein the detection unit comprises:
    an APL value calculation unit configured to calculate an APL value which is an average gradation value calculated based on the input image signal; and
    a display light flux value calculation unit configured to calculate a display light flux value by multiplying the APL value calculated by the APL value calculation unit by a maximum light flux value according to the projection apparatus,
    wherein the gradation information is the display light flux value calculated by the display light flux value calculation unit.

7. The projection apparatus according to claim 6, wherein, when the display light flux value calculated by the display light flux value calculation unit is larger than 500 lumen, the control unit controls the light source to perform two light emissions.

8. A projection apparatus for displaying an image based on an input image signal by emitting light from a light source, the projection apparatus comprising:

a rotary wheel having transparent light-transmission portions to transmit the light from the light source and gray light-transmission portions to reduce a luminance of each of a plurality of color components from the light from the light source; and a control unit configured to rotate the rotary wheel so that the image based on the input image signal of one image frame is displayed based on a first time period in which the light from the light source passes through the transparent light-transmission portions to transmit the light from the light source and a second time period, longer than the first time period, in which the light from the light source passes through the gray light-transmission portions to reduce the luminance of each of the plurality of color components.

9. The projection apparatus according to claim 8, wherein the transparent light-transmission portions have a larger light-transmission ratio and a narrower slit spacing than the gray light-transmission portions.

10. The projection apparatus according to claim 9, further comprising a generation unit configured to generate an intermediate image based on the input image signal of one image frame, wherein, when the intermediate image is displayed after an original image corresponding to the input image signal of one image frame is displayed by a display unit, the control unit rotates the rotary wheel so that the original image passes through the transparent light-transmission portions to be projected, and the intermediate image passes through the gray light-transmission portions to be projected.

11. A projection apparatus for projecting an image of a display unit by emitting light from a first light source and a second light source, the projection apparatus comprising:

a control unit configured to control the first light source to constantly emit light for a light-emission duration that is equal to an entire time period during which an image in one image frame is displayed by the display unit, and controls the second light source to emit light for a time period shorter than the light-emission duration of the first light source, wherein the control unit controls the first light source to darkly emit light while the second light source is emitting light, and to brightly emit light while the second light source is not emitting light.

12. The projection apparatus according to claim 11, further comprising:

a generation unit configured to generate an intermediate image based on the original image in one image frame, wherein, when the intermediate image is displayed after the original image is displayed by the display unit, the control unit controls the first light source to emit light in a time period during which the original image and the intermediate image are displayed, and controls the second light source to emit light in a time period during which the original image is displayed.

13. The projection apparatus according to claim 11, wherein the first light source is a lamp and the second light source is an LED.

14. A projection apparatus for displaying an image based on an input image signal by emitting light from a light source, the projection apparatus comprising:

a diaphragm mechanism configured to adjust light transmission; and a control unit configured to control opening and closing of the diaphragm mechanism so that an image corresponding to one image frame based on the input image signal is displayed based on a plurality of openings of the diaphragm mechanism including a first opening of the diaphragm mechanism and a second opening of the diaphragm mechanism, wherein an amount of opening of the diaphragm mechanism for the first opening is larger than that for the second opening and the diaphragm mechanism is closed in between the first opening and the second opening.

15. The projection apparatus according to claim 14, further comprising a generation unit configured to generate an intermediate image based on the input image signal, wherein, when the intermediate image is displayed after an original image corresponding to the input image signal of one image frame is displayed, the control unit performs a first light emission by opening the diaphragm mechanism in a time period during which the original image is displayed, and performs a second light emission by opening the diaphragm mechanism in a time period during which the intermediate image is displayed.

16. The projection apparatus according to claim 14, wherein, in a time period during which the image in one image frame is displayed, the control unit constantly performs a light emission of the light source by opening the diaphragm mechanism, and performs a short light emission of the light source by further opening the diaphragm mechanism in a short time.

17. A projection apparatus comprising:

a light emission unit configured to emit light;

a modulation unit configured to modulate the light of the light emission unit based on input image data; and a control unit configured to control operations of the modulation unit in synchronization with the timing of the light emission by the light emission unit, wherein the control unit controls the modulation unit to perform light emissions in a first light-emission mode and a second light-emission mode within one frame of the input image data, wherein, in the first light-emission mode, the light emission unit emits light having a first luminance for a first light-emission duration, wherein, in the second light-emission mode, the light emission unit emits light having a second luminance darker than the first luminance for a second light-emission duration longer than the first light-emission duration, wherein, in the first light-emission mode, the control unit controls the light emission unit to sequentially and singly perform light emission for each of a plurality of colors of the light emission unit, and, in the second light-emission mode, the control unit controls the light emission unit to simultaneously perform light emissions of the plurality of colors of the light emission unit such that images for each of the plurality of colors based on the light emission during the first light-emission mode and an image for the light emitted during the second light-emission mode are displayed within the one frame, and wherein the control unit controls the light emission unit so that the luminance of the light emitted in the second light-emission mode is darker than the total luminance of the light emitted in the first light-emission mode, and the light-emission duration in the second light-emission mode is longer than the light-emission duration for each of the plurality of colors in the first light-emission mode.

18. The projection apparatus according to claim 17, wherein the control unit controls the light modulation by the modulation unit so that a color original image according to the video signal and a monochromatic intermediate image are alternately displayed, and wherein, when the modulation unit modulates the light corresponding to the original image, the control unit controls the light emission unit to emit light in the first light-emission mode, and, when the modulation unit modulates the light corresponding to the intermediate image, the control controls the light emission unit to emit light in the second light-emission mode.

19. The projection apparatus according to claim 17, wherein, in the first light-emission mode, the control unit controls the light emission unit to sequentially and singly perform light emission for each of the plurality of colors of the light emission unit, and, in the second light-emission mode following the first light-emission mode, the control unit controls the light emission unit to sequentially and singly perform light emission for each of the plurality of colors of the light emission unit in the same order as the order in the first light-emission mode, and wherein the control unit controls the light emission unit so that the total luminance of the light emitted in the second light-emission mode is darker than the total luminance of the light emitted in the first light-emission mode, and the light-emission duration for each of the plurality of colors in the second light-emission mode is longer than the light-emission duration for each of the plurality of colors in the first light-emission mode.

20. A projection apparatus comprising:
a light emission unit configured to emit light;
a modulation unit configured to modulate the light of the light emission unit based on an input video signal;
an adjustment unit configured to: (i) select, in a first light-transmission mode, one of optical filters of different colors through which the modulated light passes and, in a second light-transmission mode, a halftone optical filter through which the modulated light passes, and (ii) adjust the color, the luminance, and the light-transmission duration of the light which passes through the selected optical filter; and
a control unit configured to control the filter selection by the adjustment unit according to the operation of the modulation unit,
wherein the control unit controls the adjustment unit to achieve light transmission in the first light-transmission mode and the second light-transmission mode within one frame of the video signal,
wherein, in the first light-transmission mode, light having a first luminance passes through each of the plurality of optical filters of different colors for a first light-transmission duration,
wherein, in the second light-transmission mode, light having a second luminance darker than the first luminance passes through the halftone optical filter for a second light-transmission duration which is longer than the first light-transmission duration, and
wherein the ratio of the first luminance and the second luminance is set to around 0.7:0.3.

21. The projection apparatus according to claim 20, wherein, in the first light-transmission mode, the control unit controls the filter selection by the adjustment unit so that the light sequentially passes through each of the plurality of optical filters of different colors.

22. The projection apparatus according to claim 20, wherein the control unit controls the filter selection by the adjustment unit so that the second luminance is darker than the total luminance of the first luminance of the light which passes through each of the plurality of optical filters of different colors, and the second light-transmission duration is longer than the first light-transmission duration during which the light passes through each of the plurality of optical filters of different colors.

23. The projection apparatus according to claim 20, wherein the control unit controls the light modulation by the modulation unit so that a color original image corresponding to the video signal and a monochromatic intermediate image are alternately displayed, and wherein, when the modulation unit modulates the light corresponding to the original image, the control unit controls the filter selection by the adjustment unit so that the light modulated by the modulation unit passes through the relevant optical filter in the first light-transmission mode, and wherein, when the modulation unit modulates the light corresponding to the intermediate image, the control unit controls the filter selection by the adjustment unit so that the light modulated by the modulation unit passes through the relevant filter in the second light-transmission mode.

24. A method for controlling a projection apparatus for displaying an image based on an input image signal by emitting light from a light source, the method comprising:
detecting gradation information from the input image signal;
determining, according to the detected gradation information from the input image signal, a number of light emissions from the light source for displaying an image corresponding to one image frame based on the input image signal based on the gradation information detected from the input image signal such that a number of light emissions of the light source for displaying the image corresponding to one image frame based on the input image signal is larger in a case where the gradation information detected from the input image signal by the detecting step corresponds to higher brightness than a predetermined brightness in comparison with a case where the gradation information detected from the input image signal by the detecting step corresponds to lower brightness than the predetermined brightness; and
controlling the light source according to the determination of the number of light emissions of the light source based on the gradation information of the input image signal by the determining step.

25. A non-transitory computer-readable storage medium storing a program for causing a computer to execute a method for controlling a projection apparatus for displaying an image based on an input image signal by emitting light from a light source, the method comprising:
detecting gradation information from the input image signal;
determining, according to the detected gradation information from the input image signal, a number of light emissions from the light source for displaying an image corresponding to one image frame based on the input image signal based on the gradation information detected from the input image signal such that a number of light emissions of the light source for displaying the image corresponding to one image frame based on the input image signal is larger in a case where the gradation information detected from the input image signal by the detecting step corresponds to higher brightness than a predetermined brightness in comparison with a case where the gradation information detected from the input image signal by the detecting step corresponds to lower brightness than the predetermined brightness; and controlling the light source according to the determination of the number of light emissions of the light source based on the gradation information of the input image signal by the determining step.

26. A method for controlling a projection apparatus for displaying an image based on an input image signal by emitting light from a light source, the projection apparatus comprising a rotary wheel having transparent light-transmission portions to transmit the light from the light source and gray light-transmission portions to reduce a luminance of each of a plurality of color components from the light from the light source, the method comprising:

rotating the rotary wheel so that the image based on the input image signal of one image frame is displayed based on a first time period in which the light from the light source passes through the transparent light-transmission portions to transmit the light from the light source and a second time period, longer than the first time period, in which the light from the light source passes through the gray light-transmission portions to reduce the luminance of each of the plurality of color components.

27. A non-transitory computer-readable storage medium storing a program for causing a computer to execute a method for controlling a projection apparatus for displaying an image based on an input image signal by emitting light from a light source, the projection apparatus comprising a rotary wheel having transparent light-transmission portions to transmit the light from the light source and gray light-transmission portions to reduce a luminance of each of a plurality of color components from the light from the light source, the method comprising:

rotating the rotary wheel so that the image based on the input image signal of one image frame is displayed based on a first time period in which the light from the light source passes through the transparent light-transmission portions to transmit the light from the light source and a second time period, longer than the first time period, in which the light from the light source passes through the gray light-transmission portions to reduce the luminance of each of the plurality of color components.

28. A method for controlling a projection apparatus for projecting an image of a display unit by emitting light from a first light source and a second light source, the method comprising:

controlling the first light source to constantly emit light for a light-emission duration that is equal to an entire time period during which an image in one image frame is displayed by the display unit, and controlling the second light source to emit light for a time period shorter than the light-emission duration of the first light source, wherein the control unit controls the first light source to darkly emit light while the second light source is emitting light, and to brightly emit light while the second light source is not emitting light.

29. A non-transitory computer-readable storage medium storing a program for causing a computer to execute a method for controlling a projection apparatus for projecting an image of a display unit by emitting light from a first light source and a second light source, the method comprising:

controlling the first light source to constantly emit light for a light-emission duration that is equal to an entire time period during which an image in one image frame is displayed by the display unit, and controlling the second light source to emit light for a time period shorter than the light-emission duration of the first light source, wherein the control unit controls the first light source to darkly emit light while the second light source is emitting light, and to brightly emit light while the second light source is not emitting light.

30. A method for controlling a projection apparatus for displaying an image based on an input image signal by emitting light from a light source, the projection apparatus comprising a diaphragm mechanism for adjusting light transmission, the method comprising:

controlling opening and closing of the diaphragm mechanism so that an image corresponding to one image frame based on the input image signal is displayed based on a plurality of openings of the diaphragm mechanism including a first opening of the diaphragm mechanism and a second opening of the diaphragm mechanism, wherein an amount of opening of the diaphragm mechanism for the first opening is larger than that for the second opening and the diaphragm mechanism is closed in between the first opening and the second opening.

31. A non-transitory computer-readable storage medium storing a program for causing a computer to execute a method for controlling a projection apparatus for displaying an image based on an input image signal by emitting light from a light source, the projection apparatus comprising a diaphragm mechanism for adjusting light transmission, the method comprising:

controlling opening and closing of the diaphragm mechanism so that an image corresponding to one image frame based on the input image signal is displayed based on a plurality of openings of the diaphragm mechanism including a first opening of the diaphragm mechanism and a second opening of the diaphragm mechanism, wherein an amount of opening of the diaphragm mechanism for the first opening is larger than that for the second opening and the diaphragm mechanism is closed in between the first opening and the second opening.

32. A method for controlling a projection apparatus comprising a light emission unit configured to emit light, a modulation unit configured to modulate the light of the light emission unit based on input image data, and a control unit configured to control operations of the modulation unit in synchronization with the timing of the light emission by the light emission unit, the method comprising:

controlling, via the control unit, the modulation unit to perform light emissions in a first light-emission mode and a second light-emission mode within one frame of the input image data;

emitting, via the light emission unit in the first light-emission mode, light having a first luminance for a first light-emission duration; and emitting, via the light emission unit in the second light-emission mode, light having a second luminance darker than the first luminance for a second light-emission duration which is longer than the first light-emission duration, wherein, in the first light-emission mode, the control unit controls the light emission unit to sequentially and singly perform light emission for each of a plurality of colors of the light emission unit, and, in the second light-emission mode, the control unit controls the light emission unit to simultaneously perform light emissions of the plurality of colors of the light emission unit such that images for each of the plurality of colors based on the light emission during the first light-emission mode and an image for the light emitted during the second light-emission mode are displayed within the one frame, and wherein the control unit controls the light emission unit so that the luminance of the light emitted in the second light-emission mode is darker than the total luminance of the light emitted in the first light-emission mode, and the light-emission duration in the second light-emission mode is longer than the light-emission duration for each of the plurality of colors in the first light-emission mode.

33. A non-transitory computer-readable storage medium storing a program for executing a method for controlling a projection apparatus comprising a light emission unit configured to emit light, a modulation unit configured to modulate the light of the light emission unit based on input image data, and a control unit configured to control operations of the modulation unit in synchronization with the timing of the light emission by the light emission unit, the method comprising:

controlling, via the control unit, the modulation unit to perform light emissions in a first light-emission mode and a second light-emission mode within one frame of the input image data;

emitting, via the light emission unit in the first light-emission mode, light having a first luminance for a first light-emission duration; and emitting, via the light emission unit in the second light-emission mode, light having a second luminance darker than the first luminance for a second light-emission duration which is longer than the first light-emission duration, wherein, in the first light-emission mode, the control unit controls the light emission unit to sequentially and singly perform light emission for each of a plurality of colors of the light emission unit, and, in the second light-emission mode, the control unit controls the light emission unit to simultaneously perform light emissions of the plurality of colors of the light emission unit such that images for each of the plurality of colors based on the light emission during the first light-emission mode and an image for the light emitted during the second light-emission mode are displayed within the one frame, and wherein the control unit controls the light emission unit so that the luminance of the light emitted in the second light-emission mode is darker than the total luminance of the light emitted in the first light-emission mode, and the light-emission duration in the second light-emission mode is longer than the light-emission duration for each of the plurality of colors in the first light-emission mode.

34. A method for controlling a projection apparatus comprising:

a light emission unit configured to emit light;
a modulation unit configured to modulate the light of the light emission unit based on an input video signal;
an adjustment unit configured to: (i) select, in a first light-transmission mode, one of a plurality of optical filters of different colors through which the modulated light passes and, in a second light-transmission mode, a halftone optical filter through which the modulated light passes, and (ii) adjust the color, the luminance, and the light-transmission duration of the light which passes through the selected optical filter; and
a control unit configured to control the filter selection by the adjustment unit according to the operation of the modulation unit, the method comprising:
controlling, via the control unit, the adjustment unit to achieve light transmission in the first light-transmission mode and the second light-transmission mode within one frame of the video signal;
passing, in the first light-transmission mode, light having a first luminance through each of the plurality of optical filters of different colors for a first light-transmission duration; and
passing, in the second light-transmission mode, light having a second luminance darker than the first luminance through the halftone optical filter for a second light-transmission duration which is longer than the first light-transmission duration,
wherein the ratio of the first luminance and the second luminance is set to around 0.7:0.3.

35. A non-transitory computer-readable storage medium storing a program for executing a method for controlling a projection apparatus comprising:

a light emission unit configured to emit light;
a modulation unit configured to modulate the light of the light emission unit based on an input video signal;
an adjustment unit configured to: (i) select, in a first light-transmission mode, one of a plurality of optical filters of different colors through which the modulated passes and, in a second light-transmission mode, a halftone optical filter through which the modulated light passes, and (ii) adjust the color, the luminance, and the light-transmission duration of the light which passes through the selected optical filter; and
a control unit configured to control the filter selection by the adjustment unit according to the operation of the modulation unit, the method comprising:
controlling, via the control unit, the adjustment unit to achieve light transmission in the first light-transmission mode and the second light-transmission mode within one frame of the video signal;
passing, in the first light-transmission mode, light having a first luminance through each of the plurality of optical filters of different colors for a first light-transmission duration; and
passing, in the second light-transmission mode, light having a second luminance darker than the first luminance through the halftone optical filter for a second light-transmission duration which is longer than the first light-transmission duration,
wherein the ratio of the first luminance and the second luminance is set to around 0.7:0.3.

* * * * *